US009658909B2

(12) United States Patent
Torino

(10) Patent No.: US 9,658,909 B2
(45) Date of Patent: May 23, 2017

(54) INFORMATION PROCESSING APPARATUS, INFORMATION PROCESSING METHOD, AND INFORMATION PROCESSING PROGRAM

(71) Applicant: FUJITSU LIMITED, Kawasaki-shi, Kanagawa (JP)

(72) Inventor: Takafumi Torino, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 14/755,564

(22) Filed: Jun. 30, 2015

(65) Prior Publication Data

US 2016/0011922 A1 Jan. 14, 2016

(30) Foreign Application Priority Data

Jul. 10, 2014 (JP) .................................. 2014-142131

(51) Int. Cl.
G06F 11/00 (2006.01)
G06F 11/07 (2006.01)
G06F 11/34 (2006.01)

(52) U.S. Cl.
CPC ...... *G06F 11/0715* (2013.01); *G06F 11/0766* (2013.01); *G06F 11/3466* (2013.01); *G06F 2201/865* (2013.01); *G06F 2201/88* (2013.01)

(58) Field of Classification Search
CPC .................................................. G06F 11/2023
USPC .......................... 714/45, 46, 47.1, 47.2, 57
See application file for complete search history.

(56) References Cited

U.S. PATENT DOCUMENTS

| 7,080,283 | B1 * | 7/2006 | Songer ............... G06F 11/3636 714/30 |
| 7,577,679 | B2 * | 8/2009 | Sinclair ............ G06F 17/30315 |
| 8,073,806 | B2 * | 12/2011 | Garg ....................... H04L 12/66 706/45 |
| 2011/0098973 | A1 * | 4/2011 | Seidman ............. G06F 11/0709 702/179 |

FOREIGN PATENT DOCUMENTS

JP          1-320550          12/1989

* cited by examiner

*Primary Examiner* — Dieu-Minh Le
(74) *Attorney, Agent, or Firm* — Fujitsu Patent Center

(57) ABSTRACT

An information processing apparatus includes a storage configured to store trace information relating to execution conditions of monitoring subjects, and a determination value, the determination value being a number of the monitoring subjects using a specific resource that can be used by the monitoring subjects, and a processor configured to increase the determination value by a predetermined value when one of the monitoring subjects starts to use the specific resource, reduce the determination value by the predetermined value when one of the monitoring subjects stops using the specific resource, and delete the trace information stored in the storage when the determination value indicates that none of the monitoring subjects are using the specific resource.

10 Claims, 20 Drawing Sheets

FIG. 11

| TRACE IDENTIFICATION ID | JOB IDENTIFICATION ID | PROGRAM IDENTIFICATION ID | EVENT | TRANSFER SOURCE PROGRAM IDENTIFICATION ID | EVENT CALL-UP SOURCE ADDRESS | PRE-UPDATE COUNTER VALUE | UPDATED COUNTER VALUE | TIME |
|---|---|---|---|---|---|---|---|---|
| 1 | JOB1 | PG1-1 | ACQUISITION | - | BLOCK 10 OF PG1-1 | 0 | 1 | 2014/09/08 13:00:31 |
| 2 | JOB1 | PG1-1 | RELEASE | - | BLOCK 30 OF PG1-1 | 1 | 0 | 2014/09/08 13:10:23 |
| 3 | JOB1 | PG1-2 | TRANSFER | PG1-1 | BLOCK 35 OF PG1-1 | 0 | 0 | 2014/09/08 13:10:23 |
| 4 | JOB1 | PG1-2 | ACQUISITION | - | BLOCK 4000 OF PG1-2 | 0 | 1 | 2014/09/08 13:10:30 |
| 5 | JOB1 | PG1-2 | ACQUISITION | - | BLOCK 4020 OF PG1-2 | 1 | 2 | 2014/09/08 13:11:02 |
| 6 | JOB1 | PG1-1 | TRANSFER | PG1-2 | BLOCK 4050 OF PG1-2 | 2 | 2 | 2014/09/08 13:15:04 |
| 7 | JOB1 | PG1-1 | RELEASE | - | BLOCK 80 OF PG1-1 | 2 | 1 | 2014/09/08 14:50:57 |
| 8 | JOB1 | PG1-3 | TRANSFER | PG1-1 | BLOCK 89 OF PG1-1 | 1 | 1 | 2014/09/08 14:50:58 |
| 9 | JOB1 | PG1-3 | RELEASE | - | BLOCK 120 OF PG1-3 | 1 | 0 | 2014/09/08 14:50:59 |
| 10 | JOB1 | PG1-1 | TRANSFER | PG1-3 | BLOCK 130 OF PG1-3 | 0 | 0 | 2014/09/08 14:55:10 |
| 11 | JOB1 | - | END | - | - | 0 | 0 | 2014/09/08 16:00:03 |

FIG. 12A

| RESOURCE IDENTIFICATION ID | TRACE INFORMATION STORAGE ADDRESS | COUNTER INFORMATION STORAGE ADDRESS |
|---|---|---|
| MEMORY AREA 1-1 | AAA | EEE |
| MEMORY AREA 1-2 | BBB | FFF |
| MEMORY AREA 1-3 | CCC | GGG |
| MEMORY AREA 1-4 | DDD | HHH |

FIG. 12B

| COUNTER VALUE |
|---|
| 2 |

FIG. 16

| TRACE IDENTIFICATION ID |
|---|
| 8 |
| 15 |
| 26 |
| 41 |
| 69 |

FIG. 18

| TRACE IDENTIFICATION ID | TIME |
|---|---|
| 1 | 13:10:12 |
| 2 | 13:10:14 |
| 3 | 13:12:03 |
| 4 | 13:12:43 |
| 5 | 13:12:44 |
| 6 | 13:12:53 |
| 7 | 13:13:03 |
| 8 | 13:13:21 |
| 9 | 13:13:29 |

FIG. 19A

| TRACE IDENTIFICATION ID | TIME |
|---|---|
| 12 | 13:19:53 |

FIG. 19B

| TRACE IDENTIFICATION ID | TIME |
|---|---|
| 25 | 13:21:59 |

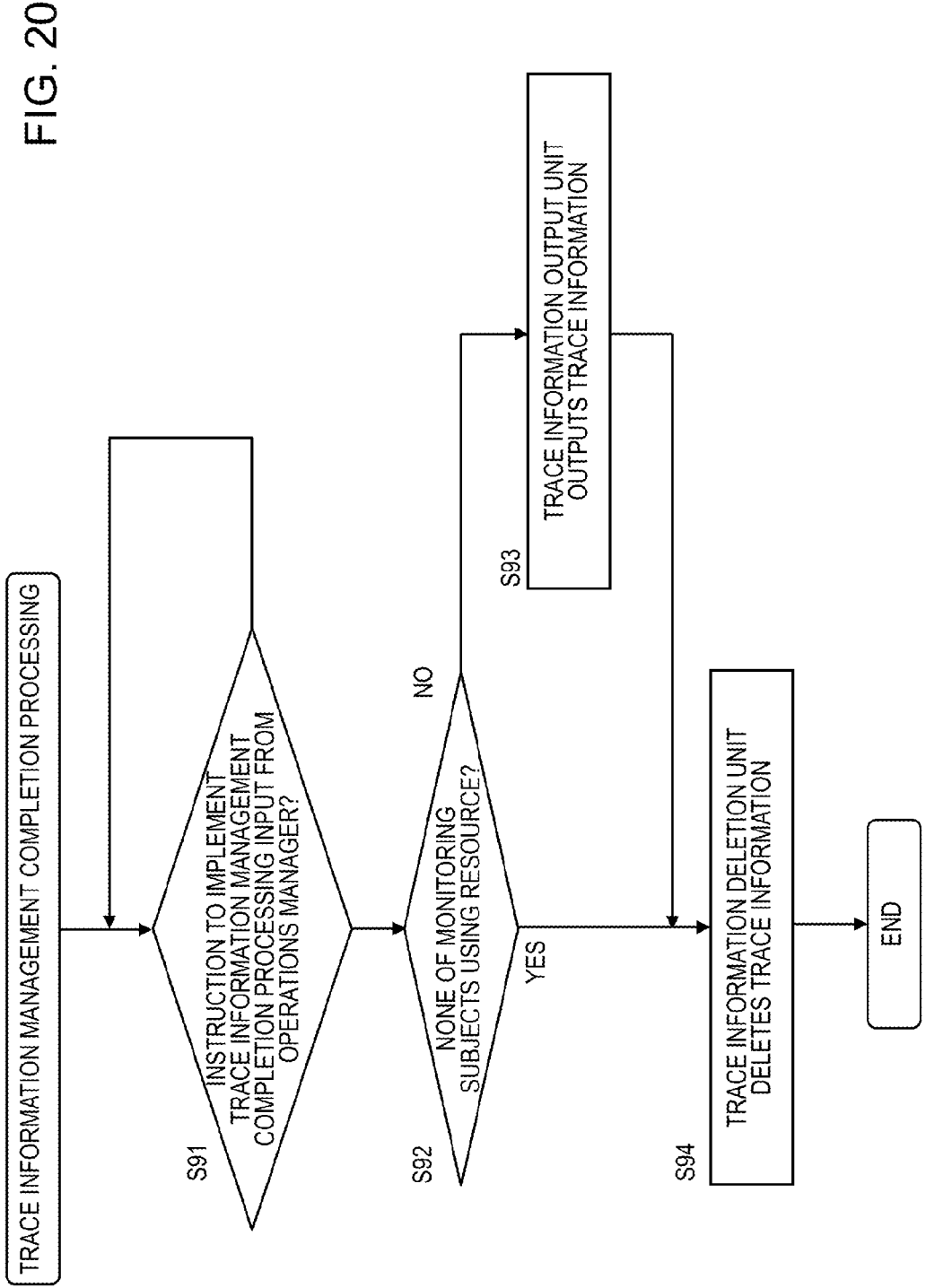

INFORMATION PROCESSING APPARATUS, INFORMATION PROCESSING METHOD, AND INFORMATION PROCESSING PROGRAM

CROSS-REFERENCE TO RELATED APPLICATION

This application is based upon and claims the benefit of priority of the prior Japanese Patent Application No. 2014-142131, filed on Jul. 10, 2014, the entire contents of which are incorporated herein by reference.

FIELD

The present invention relates to an information processing apparatus, an information processing method, and an information processing program.

BACKGROUND

In a computer on which a program operates, for example, trace information may be obtained in relation to an operating condition of the program and a usage condition of a resource (an memory, a disc, or the like) used by the program. This trace information is obtained every time the program performs predetermined processing (resource acquisition, resource release, and so on, for example) during an operation, for example. When an abnormality occurs in a processing result of the program, for example, an operations manager can determine a cause of the abnormality (specify the program in which the abnormality has occurred or the like) by referring to the obtained trace information.

More specifically, when a plurality of programs operate in parallel on the computer, for example, a resource such as a memory may be used simultaneously by the plurality of programs. In this case, the operations manager can grasp the number of programs using the resource (also referred to as counter information hereafter), for example, by referring to the trace information. Hence, in a case where the counter information indicates the existence of a program that is still using the resource even though the processing performed by all of the programs is complete, for example, the operations manager can determine that the resource is still being used by the program due to a bug or the like (this condition will also be referred to as a resource release failure hereafter) (see Japanese Patent Application Publication No. H1-320550, for example).

SUMMARY

When an abnormality such as a failure by a program to release the resource occurs, the operations manager needs to determine the cause quickly to ensure that a service provided to a user is not affected thereby. However, the obtained trace information includes a large amount of trace information obtained while the programs were operating normally. When determining the cause of the abnormality, therefore, it may take the operations manager a long time to specify the trace information that includes information relating to the abnormality. Further, a storage medium used to store the trace information has a limited capacity, and it may therefore be impossible to store the obtained trace information for a sufficient amount of time.

According to a first aspect of the embodiment, an information processing apparatus includes a storage configured to store trace information relating to execution conditions of monitoring subjects, and a determination value, the determination value being a number of the monitoring subjects using a specific resource that can be used by the monitoring subjects, and a processor configured to increase the determination value by a predetermined value when one of the monitoring subjects starts to use the specific resource, reduce the determination value by the predetermined value when one of the monitoring subjects stops using the specific resource, and delete the trace information stored in the storage when the determination value indicates that none of the monitoring subjects are using the specific resource.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a view illustrating the trace information management processing according to the first embodiment in detail.

FIG. 12A and FIG. 12B are views illustrating the trace information management processing according to the first embodiment in detail.

FIG. 16 is a view illustrating the trace information management processing according to the second embodiment.

FIG. 18 is a view illustrating the trace information management processing according to the third embodiment.

FIG. 19A and FIG. 19B are views illustrating the trace information management processing according to the third embodiment.

FIG. 20 is a flowchart illustrating the trace information management completion processing.

DESCRIPTION OF EMBODIMENTS

Configuration of Monitoring Subject Apparatus

Figure 1:
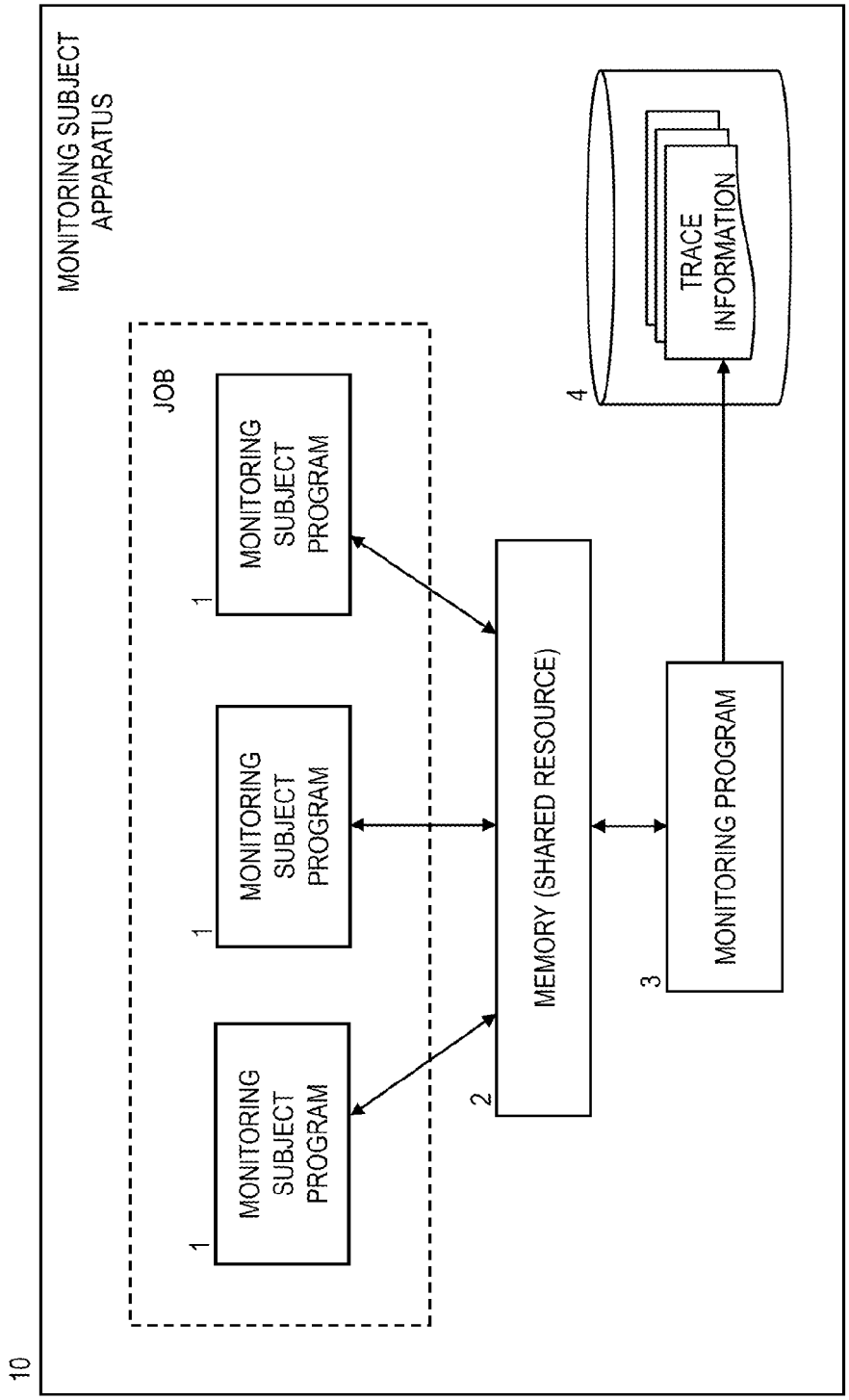
FIG. 1 is a view illustrating an overall configuration of a monitoring subject apparatus.

FIG. 1 is a view illustrating an overall configuration of a monitoring subject apparatus. A monitoring subject apparatus 10 (also referred to as an information processing apparatus 10 hereafter) depicted in FIG. 1 is a physical machine on which a monitoring subject program 1 (also referred to simply as a monitoring subject 1 hereafter) and a monitoring program 3 for monitoring the monitoring subject program 1, for example, operate. Further, the monitoring subject apparatus 10 depicted in FIG. 1 is provided with a shared resource 2 (also referred to as a resource 2 or a specific resource 2 hereafter) serving as a resource (a memory or the like, for example) that can be used by the monitoring subject program 1, and a storage medium 4 that stores trace information relating to an execution condition of the monitoring subject program 1.

The monitoring subject apparatus 10 is a physical machine on which a business system for providing a service to a user, for example, is constructed. The monitoring subject program 1, when operated by a CPU provided in the monitoring subject apparatus 10, performs various types of processing for realizing provision of the service to the user, for example. The monitoring subject program 1 may also perform processing in cooperation with another monitoring subject program that operates on the monitoring subject apparatus 10, for example. More specifically, the monitoring subject program 1 may call up another monitoring subject program operating on the monitoring subject apparatus 10 and cause the other monitoring subject program to execute processing. Note that in the example depicted in FIG. 1, three monitoring subject programs 1 operate on the monitoring subject apparatus 10, but a different number of monitoring subject programs 1 may operate thereon.

The shared resource 2 is a memory, a disc, or the like that can be accessed by the monitoring subject program 1, for example. More specifically, for example, the monitoring subject program 1 accesses the shared resource 2 as appropriate and performs acquisition processing or release processing in relation to the shared resource.

The monitoring program 3, when operated by the CPU provided in the monitoring subject apparatus 10, obtains the trace information relating to the execution condition of the monitoring subject program 1, for example. More specifically, for example, the monitoring program 3 may obtain the trace information when the monitoring subject program 1 performs the acquisition processing or the release processing in relation to the shared resource 2.

The storage medium 4 stores the trace information obtained by the monitoring program 3. Note that the storage medium 4 of the example depicted in FIG. 1 is provided in the interior of the monitoring subject apparatus 10, but the storage medium 4 may be provided on the exterior of the monitoring subject apparatus 10.

Note that the respective monitoring subject programs 1 depicted in FIG. 1 may constitute a job in which the programs are operated in sequence, and may therefore operate in cooperation with each other in order to perform certain processing. In this case, the monitoring program 3 may monitor the monitoring subject programs 1 in job units.

[Trace Information Management]

When an abnormality occurs in the monitoring subject apparatus 10, an operations manager performs an investigation to specify the program in which the abnormality has occurred or the like by referring to the trace information stored in the storage medium 4 in the example of FIG. 1. Here, when the abnormality is a failure by a program to release the shared resource 2, for example, the shared resource 2 may be insufficient, and as a result, execution of the other programs may be impaired. Depending on the content of the abnormality, therefore, the operations manager needs to determine the cause of the abnormality as quickly as possible and implement appropriate countermeasures.

However, the trace information stored in the storage medium 4 includes a large amount of trace information stored while the programs were operating normally. It may therefore take the operations manager a large amount of time to search the trace information in order to specify the trace information that includes information relating to the abnormality. In other words, when a large amount of trace information is stored, it may be impossible for the operations manager to determine the cause of the abnormality efficiently using the trace information.

Moreover, the storage medium 4 used to store the trace information has a limited capacity. Therefore, when the storage medium 4 is full, a countermeasure such as deleting the trace information having older storage times, for example, needs to be taken. When the amount of stored trace information is large, however, it may be impossible to secure a sufficient amount of time between storage and deletion of the trace information. As a result, it may be impossible for the operations manager to implement an appropriate investigation when an abnormality occurs since a part of the trace information has already been deleted.

In this embodiment, therefore, a determination as to whether or not the shared resource 2 is in use is made on the basis of the number of monitoring subject programs 1 using the shared resource 2. When it is determined that the shared resource 2 is not in use, the stored trace information relating to the execution conditions of the monitoring subject programs 1 is deleted. As a result, when one of the monitoring subject programs 1 fails to release the shared resource 2, the time taken for an investigation based on the trace information can be shortened.

[Hardware Configuration of Monitoring Subject Apparatus]

Figure 2:
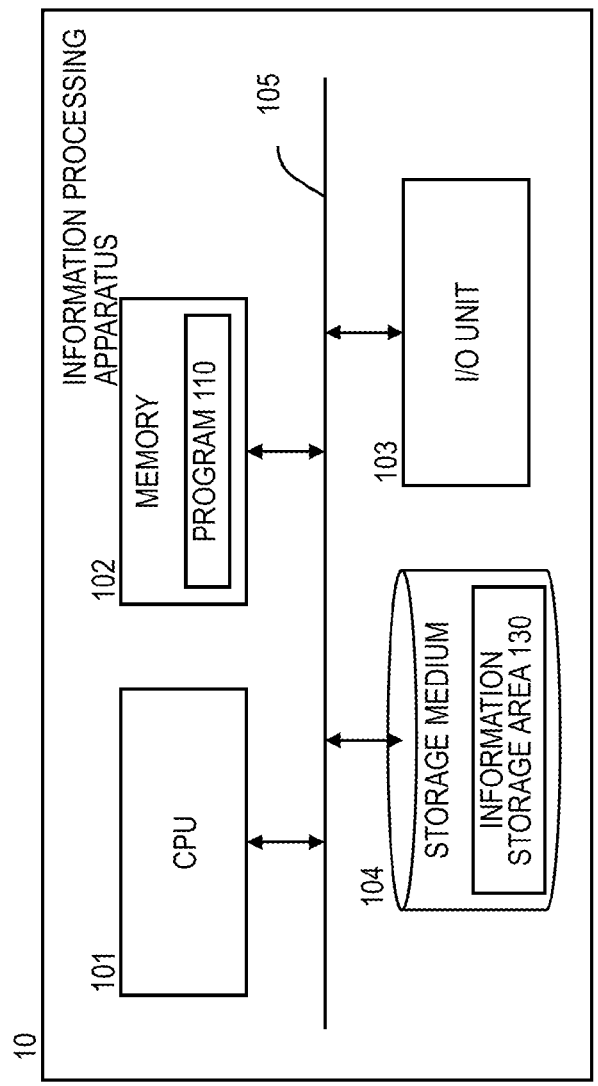
FIG. 2 is a view illustrating a hardware configuration of the monitoring subject apparatus.

Next, a configuration of the monitoring subject apparatus 10 will be described. FIG. 2 is a view illustrating a hardware configuration of the monitoring subject apparatus. The monitoring subject apparatus 10 includes a CPU 101 serving as a processor, a memory 102, an external interface (an I/O unit) 103, and a storage medium 104. These respective parts are connected to each other via a bus 105. The storage medium 104 stores, in a program storage area in the storage medium 104, for example, a program 110 (also referred to hereafter as a trace information management program) that performs processing (also referred to as trace information management processing hereafter) to manage the trace information. The CPU 101, as illustrated in FIG. 2, executes the program 110 by loading the program 110 to the memory 102 from the storage medium 104, and performs the trace information management processing in cooperation with the program 110. Further, the storage medium 104 includes an information storage area 130 (also referred to as a storage unit 130 hereafter) in which information used during the trace information management processing is stored, for example. Note that the program 110 corresponds to the monitoring program 3 of FIG. 1. Furthermore, the information storage area 130 functions as the storage medium 4 of FIG. 1, for example.

[Software Configuration of Monitoring Subject Apparatus]

Figure 3:
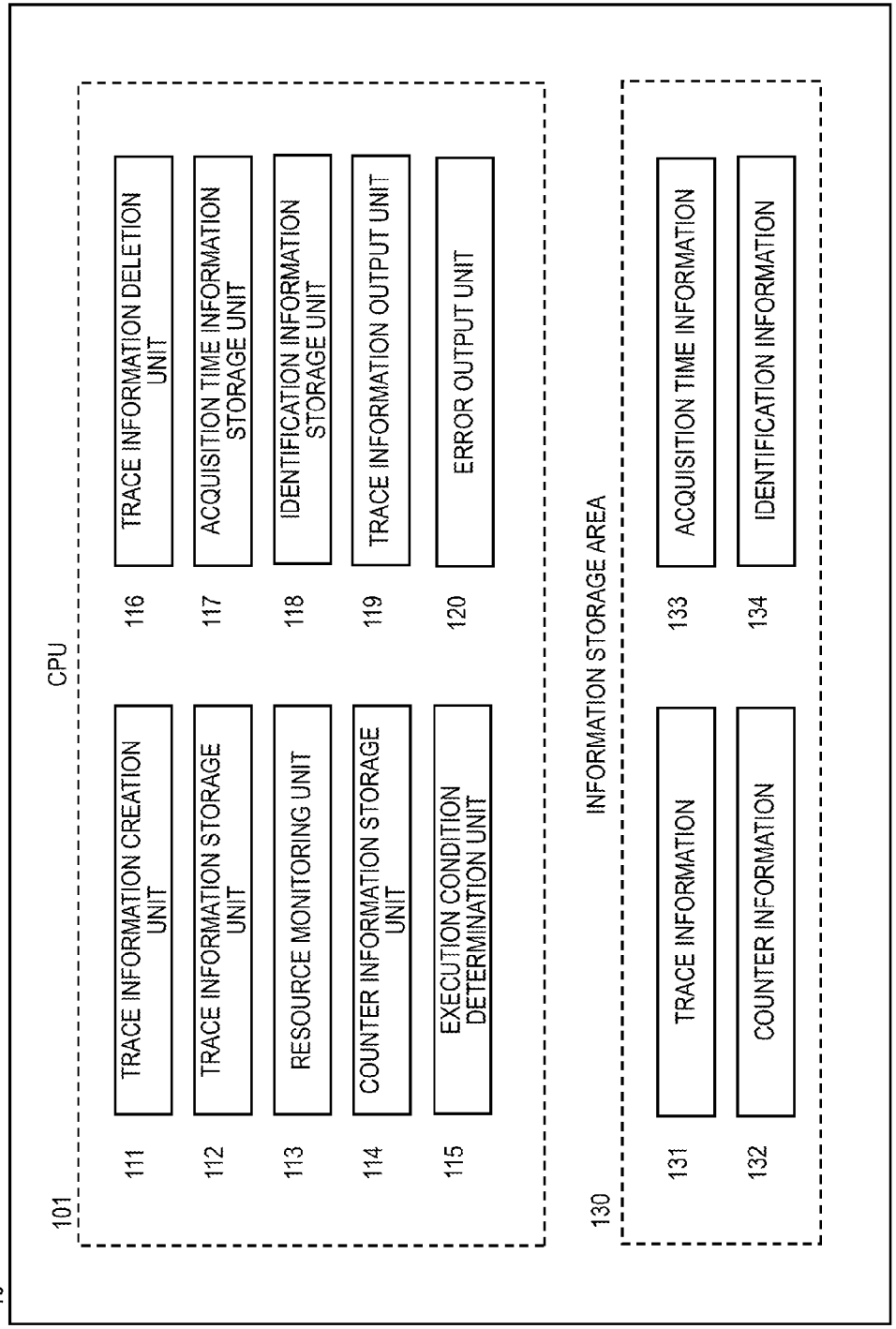
FIG. 3 is a functional block diagram of the monitoring subject apparatus depicted in FIG. 2.

FIG. 3 is a functional block diagram of the monitoring subject apparatus depicted in FIG. 2. The CPU 101, in cooperation with the program 110, operates as a trace information creation unit 111, a trace information storage unit 112, a resource monitoring unit 113, a counter information storage unit 114, an execution condition determination unit 115, and a trace information deletion unit 116, for example. The CPU 101 also operates as an acquisition time information storage unit 117, an identification information storage unit 118, a trace information output unit 119, and an error output unit 120 in cooperation with the program. More specifically, these functions may constitute a part of functions packaged in an operating system (an OS hereafter) of the monitoring subject apparatus 10. Note that the execution condition determination unit 115 and the trace information deletion unit 116 will also be referred to together as a processing unit hereafter. Further, trace information 131, counter information 132, acquisition time information 133, and identification information 134, for example, are stored in the information storage area 130.

The trace information creation unit 111 creates the trace information 131 in relation to the execution condition of the monitoring subject program 1, for example. When the monitoring subject program 1 performs a predetermined operation, for example, the trace information creation unit 111 detects the predetermined operation and creates the trace information 131. The predetermined operation may be an operation performed by the monitoring subject program 1 to acquire or release a partial area of the shared resource 2, for example.

The trace information storage unit 112 stores the created trace information 131 in response to creation of the trace information 131 by the trace information creation unit 111, for example. More specifically, the trace information storage unit 112 may store the trace information 131 in the information storage area 130, for example. Note that the trace information 131 corresponds to the trace information depicted in FIG. 1.

The resource monitoring unit 113 monitors the shared resource 2 at a predetermined timing, for example. For example, the resource monitoring unit 113 detects the number of monitoring subject programs 1 that have acquired the shared resource 2 (i.e. the number of processes implemented by the monitoring subject programs 1). The resource monitoring unit 113 then instructs the counter information storage unit 114, to be described below, to store information (also referred to as the counter information 132 hereafter) indicating the detected number of monitoring subject programs 1 in the information storage area 130, for example. Note that the predetermined timing may be a periodic timing interval of 10 (ms) or the like, for example.

Having received the instruction to store the counter information 132 from the resource monitoring unit 113, the counter information storage unit 114 stores the counter information 132 in the information storage area 130, for example. More specifically, when the resource monitoring unit 113 determines that one of the monitoring subject programs 1 has newly acquired the shared resource 2, for example, the counter information storage unit 114 increases a value (also referred to as a determination value hereafter) indicated by the counter information 132 by a predetermined value (1, for example). Further, when the resource monitoring unit 113 determines that one of the monitoring subject programs 1 has released the shared resource 2, for example, the counter information storage unit 114 reduces the determination value by a predetermined value (1, for example). Note that when the counter information 132 is already stored in the information storage area 130, the counter information storage unit 114 may store the new counter information 132 by overwriting the new counter information 132 onto the stored counter information 132, for example.

The execution condition determination unit 115 determines that none of the monitoring subject programs 1 are using the shared resource 2 (i.e. that all of the monitoring subject programs 1 have released the shared resource 2) on the basis of the determination value, for example. More specifically, when the determination value is 0, for example, the execution condition determination unit 115 may determine, or in other words detect, that none of the monitoring subject programs 1 have acquired the shared resource 2. Note that the execution condition determination unit 115 may also perform this determination on the basis of the determination value when one of the monitoring subject programs 1 calls up another program and when the processing of the job that includes the monitoring subject programs 1 is completed.

The trace information deletion unit 116 deletes the trace information 131 stored in the information storage area 130 when the execution condition determination unit 115 determines that all of the monitoring subject programs 1 have released the shared resource 2, for example.

The acquisition time information storage unit 117 stores the acquisition time information 133, which is information relating to a creation time of the trace information 131, in the information storage area 130 when the trace information storage unit 112 stores the trace information 131, for example.

When the execution condition determination unit 115 determines that all of the monitoring subject programs 1 have released the shared resource 2, the identification information storage unit 118 stores the identification information 134 identifying the trace information 131 stored at the time of the determination, for example.

When a predetermined condition is satisfied, for example, the trace information output unit 119 stores the trace information 131 stored in the information storage area 130 in an external storage medium, for example. The predetermined condition may be satisfied when, for example, not all of the monitoring subject programs 1 have released the shared resource 2 even though the processing of the job is complete.

The error output unit 120 outputs an error when, for example, the determination value stored in the information storage area 130 takes an abnormal value (a value lower than 0, for example). Note that after outputting the error, the error output unit 120 may instruct the trace information deletion unit 116 to stop deleting the trace information 131.

First Embodiment

Figure 4:
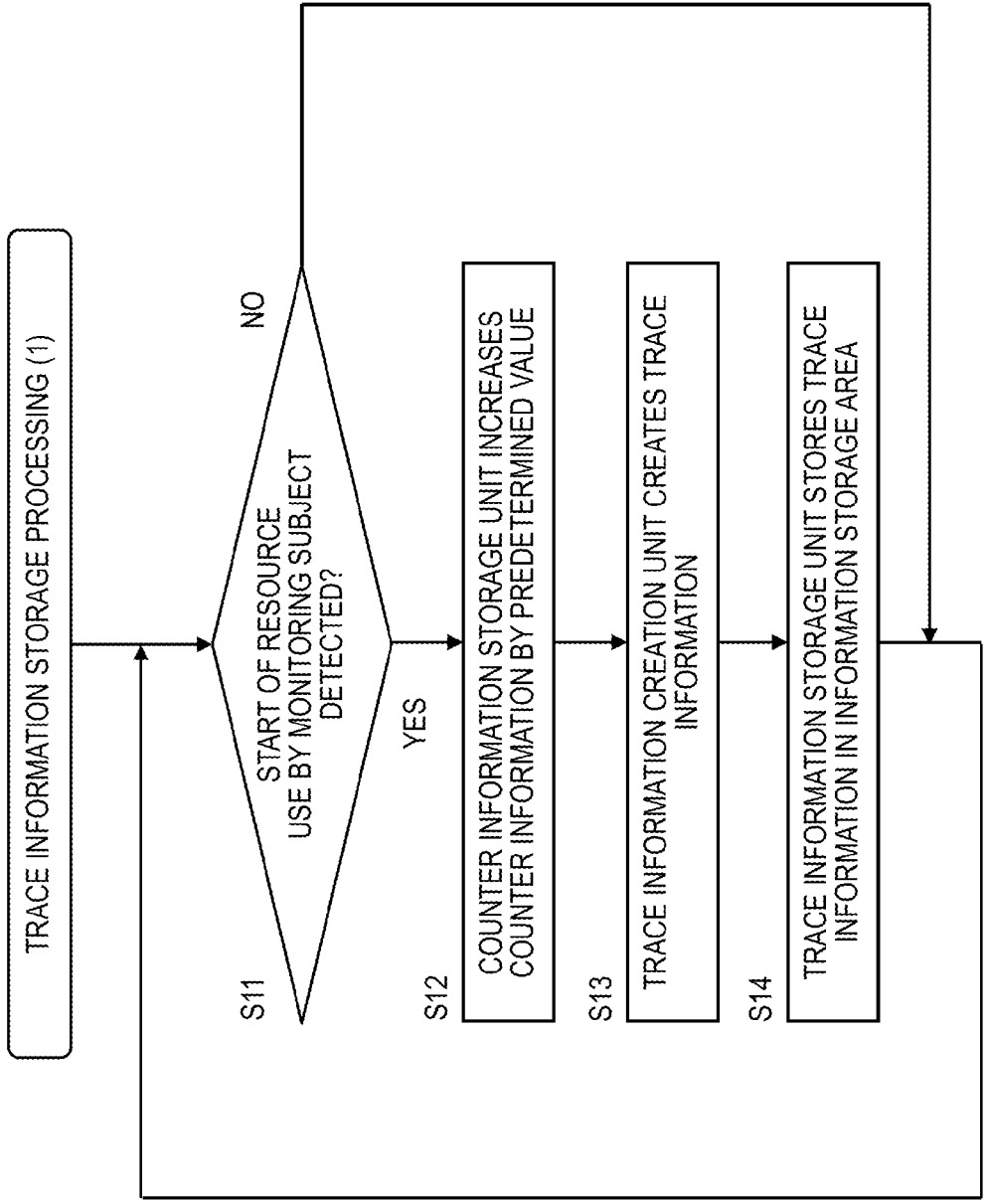
FIG. 4 to FIG. 6 are schematic flowcharts illustrating the trace information management processing according to the first embodiment.
Figure 5:
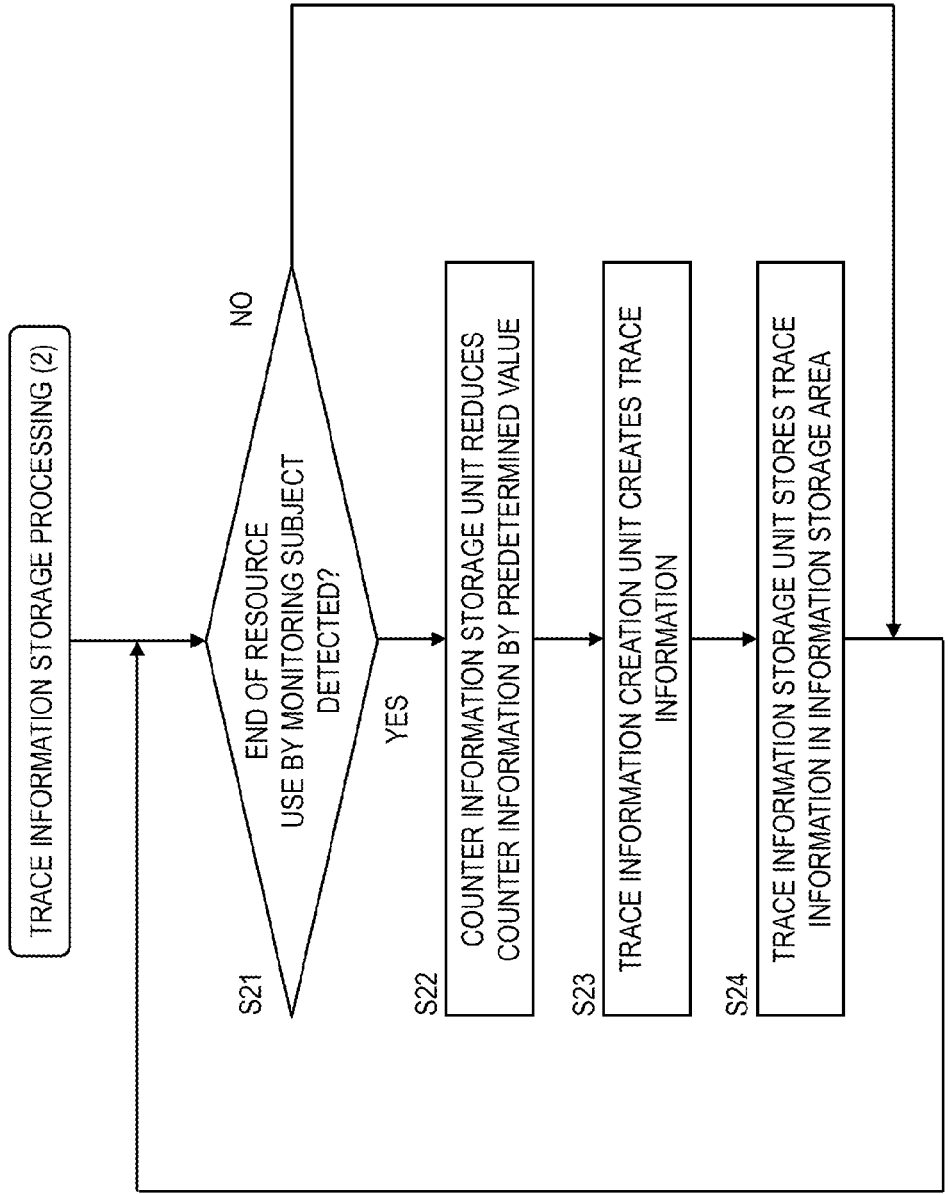
Figure 6:
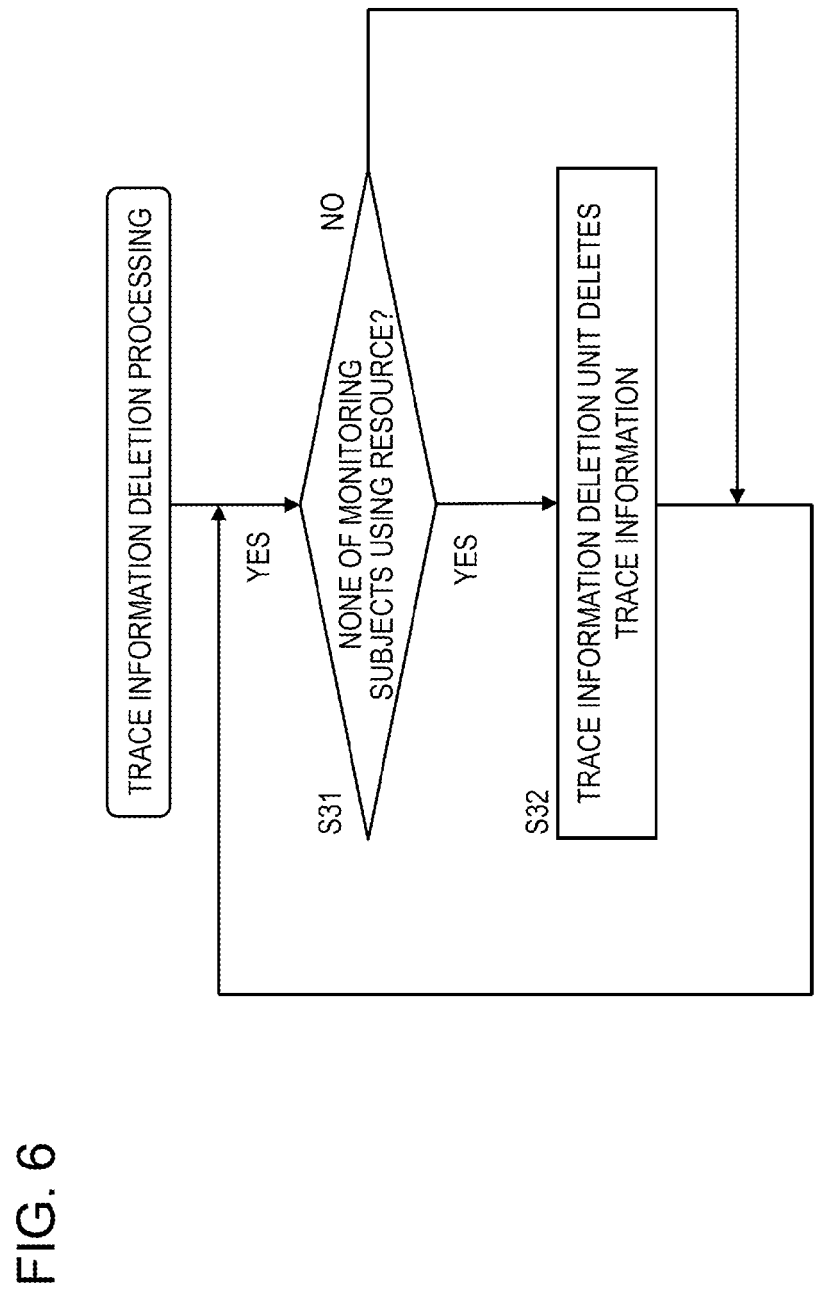
Figure 7:
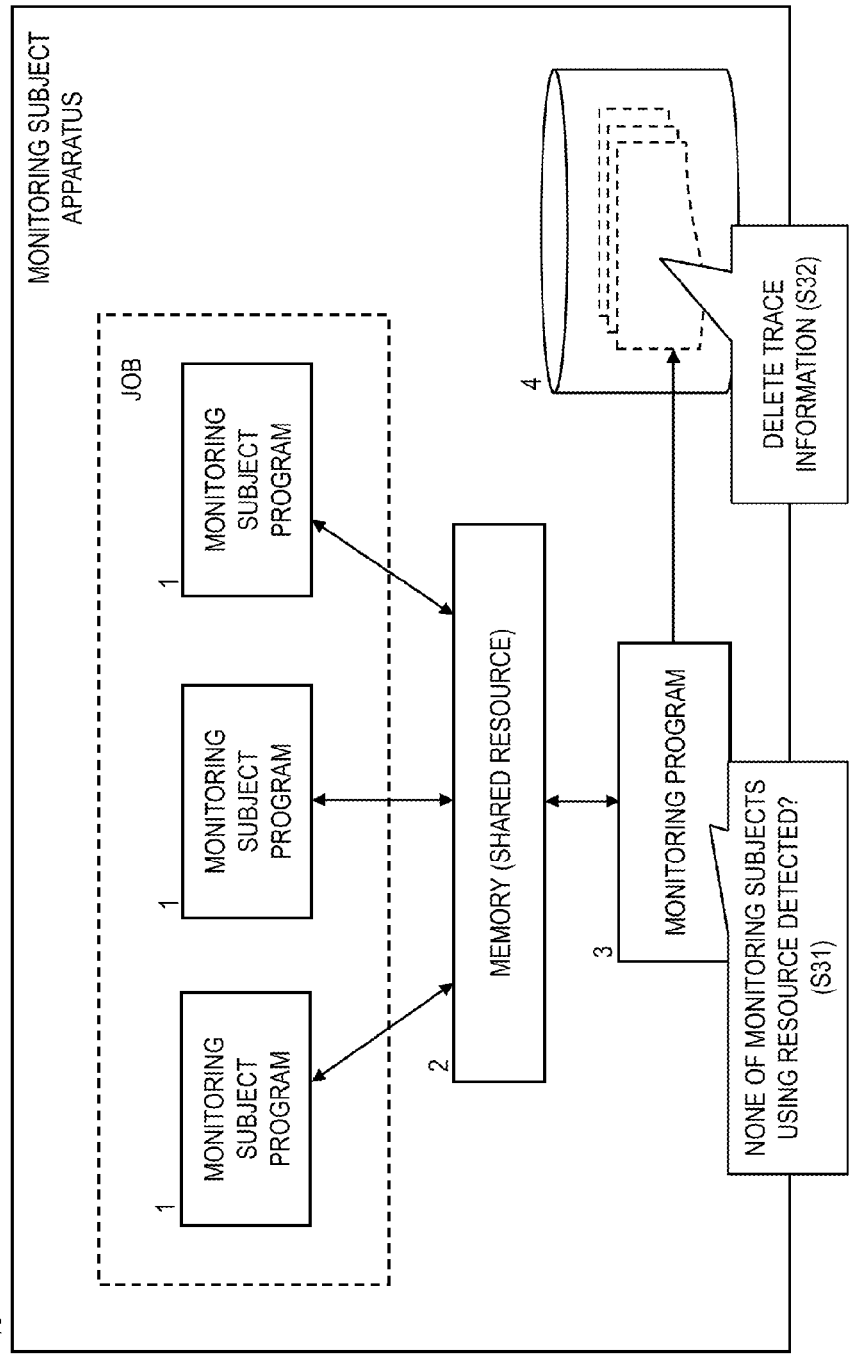
FIG. 7 is a schematic view illustrating the trace information management processing according to the first embodiment.

Next, a first embodiment will be described. FIG. 4 to FIG. 6 are schematic flowcharts illustrating the trace information management processing according to the first embodiment. Further, FIG. 7 is a schematic view illustrating the trace information management processing according to the first embodiment. An outline of the trace information management processing illustrated in FIG. 4 to FIG. 6 will be described below while referring to FIG. 7. Note that processing for storing the trace information during the trace information management processing will be referred to as trace information storage processing. Further, processing for deleting the trace information during the trace information management processing will be referred to as trace information deletion processing. The trace information storage processing is described below.

[Trace Information Storage Processing]

FIG. 4 is a flowchart relating to the trace information storage processing performed when one of the monitoring subject programs 1 starts to use the shared resource 2, and FIG. 5 is a flowchart relating to the trace information storage processing performed when one of the monitoring subject programs 1 stops using the shared resource 2. Note that in the following description, it is assumed that the trace information 131 is created by the trace information creation unit 111 when the monitoring subject program 1 starts to use the shared resource 2 and when the monitoring subject program 1 stops using the shared resource 2.

In the trace information storage processing illustrated in FIG. 4, first, the monitoring subject apparatus 10 remains on standby (NO in S11) until it is determined thereby that one of the monitoring subject programs 1 has started to use the shared resource 2, for example. In other words, the monitoring subject apparatus 10 remains on standby until it is determined thereby that one of the monitoring subject programs 1 has acquired the shared resource 2, for example. Having determined that one of the monitoring subject programs 1 has started to use the shared resource 2 (YES in S11), the monitoring subject apparatus 10 increments the counter information 132 stored in the information storage area 130 by the predetermined value (1, for example), for example (S12). Furthermore, in this case, the monitoring subject apparatus 10 creates the trace information 131 relating to the execution condition of the monitoring subject program 1 that has started to use the shared resource 2, for example (S13). The monitoring subject apparatus 10 then stores the created trace information 131 in the information storage area 130, for example (S14).

In other words, by storing the counter information 132, the monitoring subject apparatus 10 manages the number of monitoring subject programs 1 using the shared resource 2. In so doing, as will be described below, the monitoring subject apparatus 10 can determine whether or not to delete the trace information 131 stored in the information storage area 130 on the basis of the value indicated by the counter information 132.

Next, the trace information storage processing performed when one of the monitoring subject programs 1 stops using the shared resource 2 will be described. In the trace information storage processing illustrated in FIG. 5, the monitoring subject apparatus 10 remains on standby (NO in S21) until it is determined thereby that one of the monitoring subject programs 1 has stopped using the shared resource 2, for example. In other words, the monitoring subject apparatus 10 remains on standby until it is determined thereby that one of the monitoring subject programs 1 has released the shared resource 2, for example. Having determined that one of the monitoring subject programs 1 has stopped using the shared resource 2 (YES in S21), the monitoring subject apparatus 10 decrements the counter information 132 stored in the information storage area 130 by the predetermined value, for example (S22). The predetermined value by which the counter information 132 is decremented needs to be identical to the value by which the counter information 132 is increased when the shared resource 2 is acquired, for example. Furthermore, the monitoring subject apparatus 10 creates the trace information 131 relating to the execution condition of the monitoring subject program 1 that has stopped using the shared resource 2, for example (S23). The monitoring subject apparatus 10 then stores the created trace information 131 in the information storage area 130, for example (S24).

In other words, the monitoring subject apparatus 10 increments the counter information 132 after determining that the shared resource 2 has been acquired by the monitoring subject program 1, for example. Further, after determining that the shared resource 2 has been released by the monitoring subject program 1, the monitoring subject apparatus 10 decrements the counter information 132 by the amount by which the counter information 132 was incremented upon acquisition of the shared resource 2. Hence, when the counter information indicates 0, the monitoring subject apparatus 10 can determine that all of the monitoring subject programs 1 have released the shared resource 2, as will be described below.

[Trace Information Deletion Processing]

Next, the trace information deletion processing will be described. FIG. 6 is a flowchart relating to the trace information deletion processing. In the trace information deletion processing illustrated in FIG. 6, first, the monitoring subject apparatus 10 remains on standby (NO in S31) until it is determined thereby that all of the monitoring subject programs 1 have stopped using the shared resource 2, for example. In other words, the monitoring subject apparatus 10 remains on standby until it is determined thereby that all of the monitoring subject programs 1 have released the shared resource 2, for example. More specifically, for example, the monitoring subject apparatus 10 may check the counter information 132 stored in the information storage area 130 periodically, and determine that all of the monitoring subject programs 1 have released the shared resource 2 when the value indicated by the counter information 132 is 0.

Having determined that none of the monitoring subject programs 1 are using the shared resource 2 (YES in S31), the monitoring subject apparatus 10 deletes the trace information 131 stored in the information storage area 130, as illustrated in FIG. 7, for example (S32). When the monitoring subject apparatus 10 determines that none of the monitoring subject programs 1 are using the shared resource 2, this means that all of the monitoring subject programs 1 that acquired the shared resource 2 have released the shared resource 2. In this case, therefore, the monitoring subject apparatus 10 determines that a resource release failure by one of the monitoring subject programs 1 has not occurred. Accordingly, in this case, the monitoring subject apparatus 10 deletes the trace information 131 stored in the information storage area 130.

In other words, when none of the monitoring subject programs 1 are using the shared resource 2, the monitoring subject apparatus 10 determines that a failure to release the shared resource 2 has not occurred, and determines as a result that the currently stored trace information 131 does not include information to be checked in the event of an abnormality. In this case, therefore, the monitoring subject apparatus 10 deletes all of the trace information 131 stored in the information storage area 130, for example. When one of the monitoring subject programs 1 is found to be using the shared resource 2, on the other hand, the monitoring subject apparatus 10 is not able to determine whether or not a resource release failure has occurred on the basis of the counter information 132. In this case, therefore, the monitoring subject apparatus 10 does not delete the trace information 131.

Hence, according to the first embodiment, the monitoring subject apparatus 10 includes the storage unit 130 that stores the trace information 131 relating to the execution conditions of the monitoring subjects 1 and the determination value indicating the number of monitoring subjects 1 using the shared resource 2 that can be used by the monitoring subjects 1. Further, the monitoring subject apparatus 10 increases the determination value by the predetermined value when one of the monitoring subjects 1 starts to use the shared resource 2, and reduces the determination value by the predetermined value when one of the monitoring subjects 1 stops using the shared resource 2. The monitoring subject apparatus 10 also includes a processing unit for deleting the trace information 131 stored in the storage unit 130 when it is determined on the basis of the determination value that none of the monitoring subjects 1 are using the shared resource 2. Hence, after determining that the entire shared resource 2 is not in use by the monitoring subjects 1, the monitoring subject apparatus 10 can delete the trace information 131 since there is no need to check the trace information 131 in the event of a failure to release the shared resource 2. As a result, the time taken by the monitoring subject apparatus 10 to perform an investigation when a failure to release the shared resource 2 occurs can be shortened.

Note that the trace information storage processing depicted in FIG. 4 and FIG. 5 may be started when acquisition of the shared resource 2 by another function of the OS is detected, for example. Further, the trace information deletion processing depicted in FIG. 6 may be started when release of the shared resource 2 by another function of the OS is detected, for example.

[Detailed Description of First Embodiment]

Figure 8:
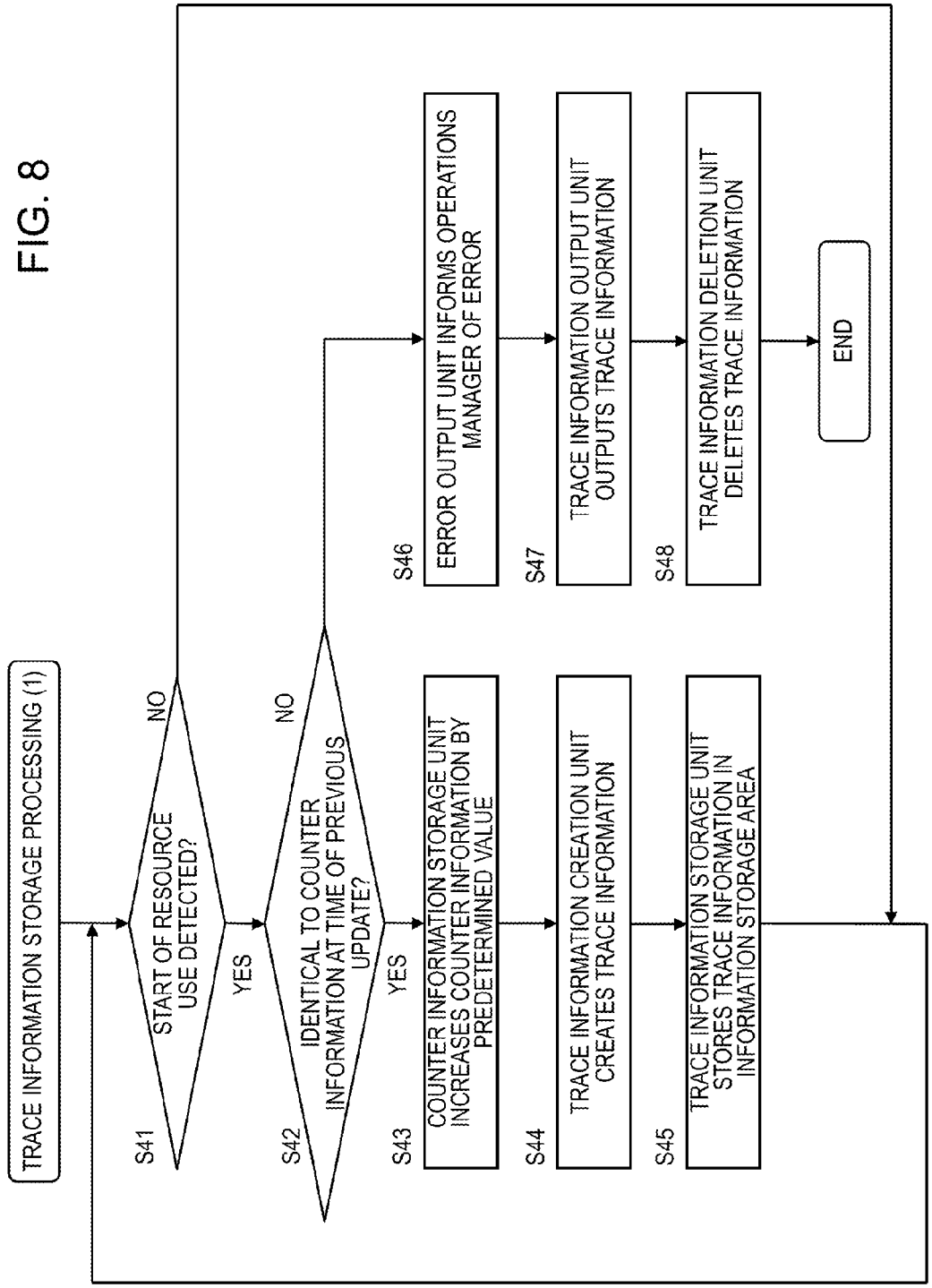
FIG. 8 to FIG. 10 are flowcharts illustrating in detail the trace information management processing according to the first embodiment.
Figure 9:
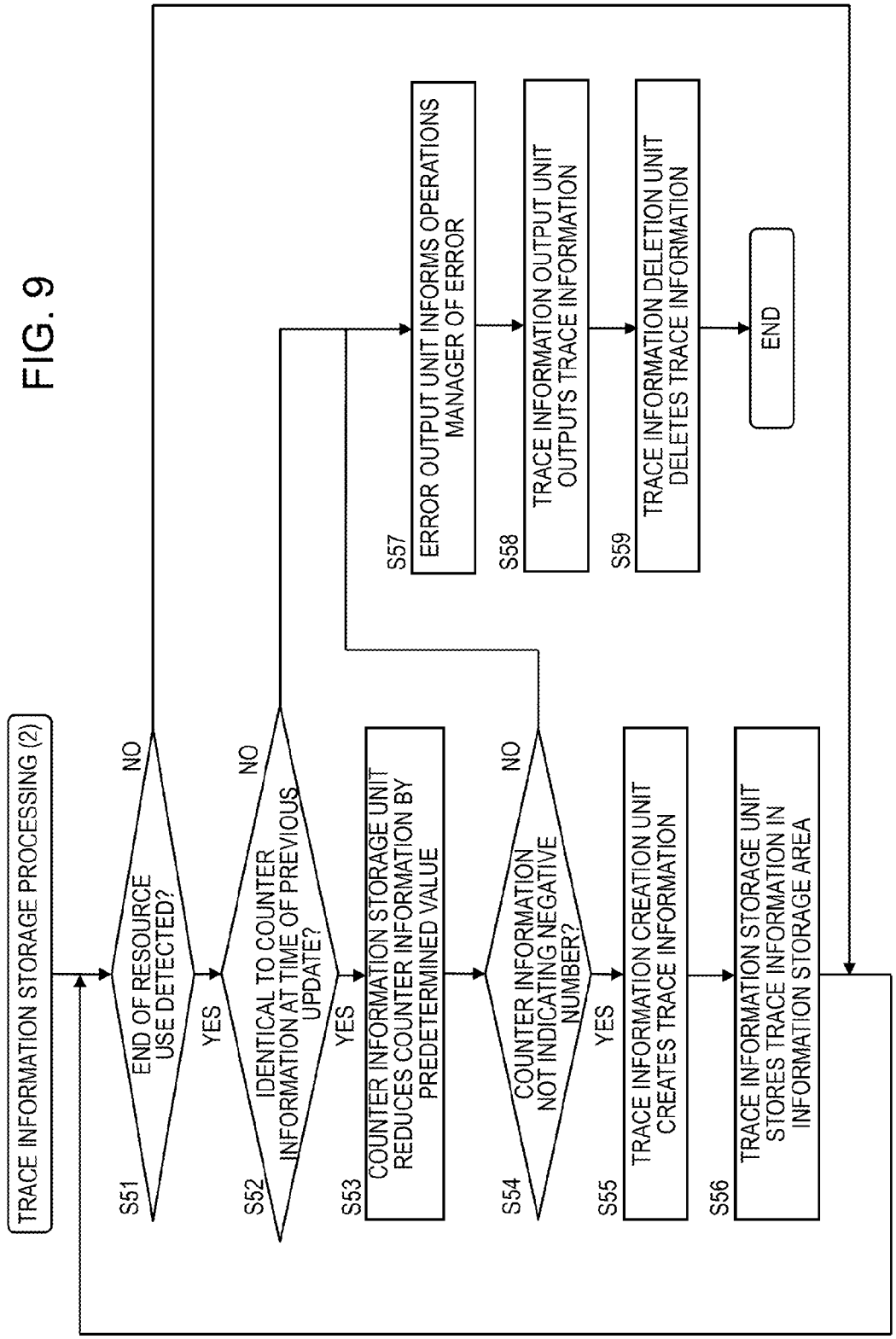
Figure 10:
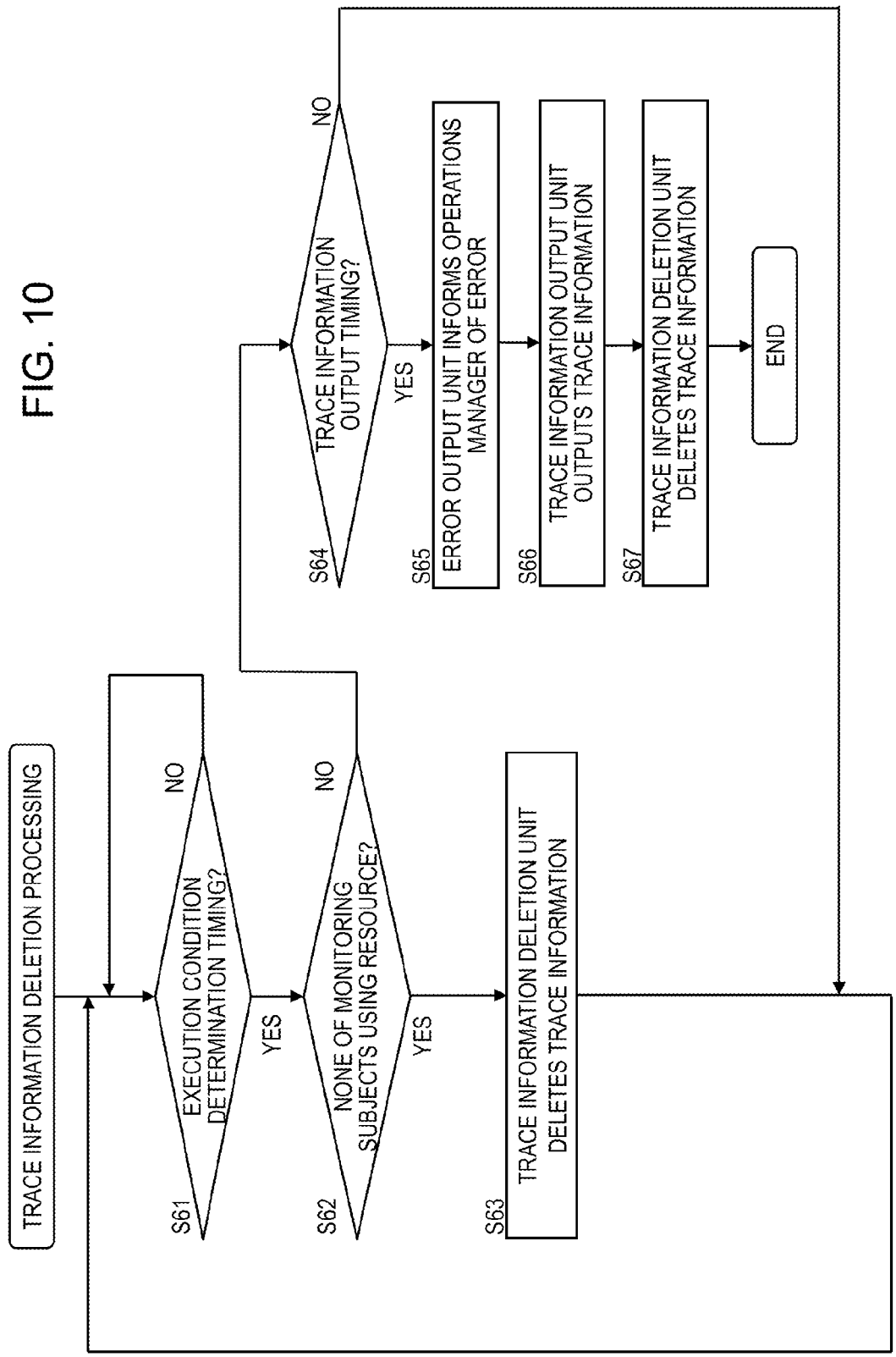

Next, the first embodiment will be described in detail. FIG. 8 to FIG. 10 are flowcharts illustrating in detail the trace information management processing according to the first embodiment. Further, FIG. 11 to FIG. 14 are views illustrating the trace information management processing according to the first embodiment in detail. The trace information management processing illustrated in FIG. 8 to FIG. 10 will be described in detail below while referring to FIG. 11 to FIG. 14.

[Detailed Description of Trace Information Storage Processing Upon Acquisition of Shared Resource]

First, the trace information storage processing performed when the shared resource 2 is acquired will be described in detail. As illustrated in FIG. 8, the resource monitoring unit 113 of the monitoring subject apparatus 10 remains on standby (NO in S41) until it is determined thereby that one of the monitoring subject programs 1 has started to use the shared resource 2, for example. In other words, the resource monitoring unit 113 remains on standby until it is determined thereby that one of the monitoring subject programs 1 has acquired the shared resource 2, for example.

Having determined that one of the monitoring subject programs 1 has started to use the shared resource 2 (YES in S41), the resource monitoring unit 113 obtains the value of the counter information 132 (also referred to as the previous counter information 132 hereafter) resulting from a previous update of the counter information 132, for example. The resource monitoring unit 113 then compares the respective values of the previous counter information 132 and the current counter information 132, for example (S42). When, as a result, the respective values of the previous counter information 132 and the current counter information 132 are identical (YES in S42), the counter information storage unit 114 increases the value of the counter information 132 stored in the information storage area 130 by the predetermined value (1, for example), for example (S43).

The value of the counter information 132 may be updated after being increased or reduced in response to acquisition or release of the shared resource 2 but before next being increased or reduced in response to acquisition or release of the shared resource 2. More specifically, the counter information 132 may be updated due to a factor (referred to hereafter as an external factor) other than acquisition or release of the shared resource 2, such as a memory breakdown caused by another program, for example. In this case, the information indicating the number of monitoring subject programs 1 using the shared resource 2 is not stored correctly in the counter information 132. Hence, by confirming that the value of the previous counter information 132 is identical to the value of the current counter information 132, the resource monitoring unit 113 confirms that the counter information 132 has not been updated due to an external factor.

After the counter information storage unit 114 increments the counter information 132 (S43), the trace information creation unit 111 obtains the trace information 131 relating to the execution condition of the monitoring subject program 1 that has started to use the shared resource 2, for example (S44). The trace information storage unit 112 then stores the trace information 131 created by the trace information creation unit 111 in the information storage area 130, for example (S45).

Note that the previous counter information 132 may be obtained by referring to the trace information 131 already stored in the information storage area 130, for example. In other words, the trace information storage unit 112 stores the counter information 132 at the creation time of the trace information 131 together with the trace information 131. The resource monitoring unit 113 may then obtain the previous counter information 132 by referring to the trace information 131 stored in the information storage area 130 after determining that one of the monitoring subject programs 1 has started to use the shared resource 2 (YES in S41). The trace information 131 will be described in detail below.

When the respective values of the previous counter information 132 and the current counter information 132 are different (NO in S42), on the other hand, the error output unit 120 of the monitoring subject apparatus 10 notifies the operations manager that an error has occurred, for example (S46). More specifically, in this case, the error output unit 120 determines that the counter information 132 has been updated due to an external factor, and notifies the operations manager thereof. When the error output unit 120 outputs an error (S46), the trace information output unit 119 of the monitoring subject apparatus 10 outputs the trace information 131 stored in the information storage area 130, for example (S47). In this case, the trace information output unit 119 may store the trace information 131 in another storage medium or the like from which the trace information 131 is not deleted by the trace information deletion unit 116. More specifically, in this case, the trace information output unit 119 outputs the trace information 131 stored in the information storage area 130 to the other storage medium or the like so that the operations manager can determine the cause of the error thereafter.

Further, when the error output unit 120 outputs the error (S46), the trace information deletion unit 116 of the monitoring subject apparatus 10 may delete all of the trace information 131 stored in the information storage area 130, for example (S48).

As depicted in FIG. 8, the error output unit 120 temporarily terminates the trace information management processing after outputting the error (S46), for example. More specifically, when an error occurs, the trace information 131 created thereafter may be affected by the error. The operations manager may restart the trace information management processing after determining the cause of the error and completing appropriate countermeasures.

[Detailed Description of Trace Information Storage Processing Upon Release of Shared Resource]

Next, the trace information storage processing performed when the shared resource 2 is released will be described in detail. As illustrated in FIG. 9, the resource monitoring unit 113 remains on standby (NO in S51) until it is determined thereby that one of the monitoring subject programs 1 has stopped using the shared resource 2, for example. In other words, the resource monitoring unit 113 remains on standby until it is determined thereby that one of the monitoring subject programs 1 has released the shared resource 2, for example.

Having determined that one of the monitoring subject programs 1 has stopped using the shared resource 2 (YES in S51), the resource monitoring unit 113 compares the value of the previous counter information 132 with the value of the current counter information 132, similarly to the case depicted in FIG. 8, for example (S52). The comparison between the value of the previous counter information 132 and the current counter information 132 was described using FIG. 8, and therefore further description thereof has been omitted. When the respective values of the previous counter information 132 and the current counter information 132 are identical (YES in S52), the counter information storage unit 114 decrements the counter information 132 stored in the information storage area 130 by the predetermined value, for example (S53).

When the respective values of the counter information 132 obtained in the previous update and the current counter information 132 are different (NO in S52), on the other hand, the error output unit 120 notifies the operations manager that an error has occurred, for example (S57). Furthermore, in this case, for example, the trace information output unit 119 may output the trace information 131 (S58) and the trace information deletion unit 116 may delete the trace information 131 (S59). A case in which the error output unit 120 outputs an error was described using FIG. 8, and therefore detailed description of this case has been omitted.

After reducing the value of the counter information 132 (S53), the counter information storage unit 114 checks the counter information 132 to ensure that the counter information 132 does not indicate a negative number (S54). When the counter information 132 indicates a negative number (NO in S54), the error output unit 120 outputs an error, for example (S57). More specifically, the counter information storage unit 114 increments the counter information 132 when the resource monitoring unit 113 determines that the shared resource 2 has been acquired, and decrements the counter information 132 when the resource monitoring unit 113 determines that the shared resource 2 has been released. During a normal operation, therefore, the value indicated by the counter information 132 is always equal to or larger than 0. Hence, when the counter information 132 indicates a negative number, as depicted in FIG. 9, for example, the error output unit 120 determines that an abnormality has occurred due to a bug or the like in a program, and outputs an error.

Next, similarly to the case illustrated in FIG. 8, the trace information creation unit 111 creates the trace information 131 relating to the execution condition of the monitoring subject program 1 that has stopped using the shared resource 2, for example (S55). The trace information storage unit 112 then stores the trace information 131 created by the trace information creation unit 111 in the information storage area 130, for example (S56).

[Detailed Description of Trace Information Deletion Processing]

Next, the trace information deletion processing will be described in detail. In FIG. 10, first, the execution condition determination unit 115 of the monitoring subject apparatus 10 remains on standby (NO in S61) until a timing at which to implement an execution condition determination arrives, for example. The timing at which to implement the execution condition determination may be set to arrive when, for example, one of the monitoring subject programs 1 calls up another program or the processing of the job including the monitoring subject programs 1 is completed. When the timing at which to implement the execution condition determination arrives (YES in S61), the execution condition determination unit 115 determines whether or not all of the monitoring subject programs 1 have stopped using the shared resource 2 (S62). When the execution condition determination unit 115 determines as a result that none of the monitoring subject programs 1 are using the shared resource 2 (YES in S62), the trace information deletion unit 116 deletes all of the trace information 131 stored in the information storage area 130, for example (S63).

More specifically, when the execution condition determination unit 115 determines that all of the monitoring subject programs 1 have released the shared resource 2, it may be determined that a failure to release the shared resource 2 has not occurred at this point in time. Accordingly, the trace information 131 at this point in time does not include information relating to an abnormality caused by a release failure, and will not therefore need to be checked when a failure to release the shared resource 2 occurs in the future. In this case, therefore, the trace information deletion unit 116 deletes all of the trace information 131 stored in the information storage area 130. In so doing, the amount of trace information that needs to be checked by the operations manager when a failure to release the shared resource 2 occurs in the future can be suppressed. As a result, when a failure to release the shared resource 2 occurs, the operations manager can quickly take measures to determine the cause of the failure, such as specifying the program in which the abnormality has occurred.

When the execution condition determination unit 115 determines that one of the monitoring subject programs 1 is still using the shared resource 2 (NO in S62), on the other hand, the trace information output unit 119 determines whether or not a timing at which to output the stored trace information 131 has arrived, for example (S64). The timing at which to output the stored trace information 131 may be set to arrive when, for example, the job including the monitoring subject programs 1 is complete at the execution condition determination timing of S61. In other words, when one of the monitoring subject programs 1 is still using the shared resource 2 even though the job including the monitoring subject programs 1 is complete, it is highly likely that a failure to release the shared resource 2 has occurred due to a bug or the like. In this case, therefore, the trace information output unit 119 outputs the trace information 131 so that the operations manager can determine the cause of the abnormality.

Note that the trace information output unit 119 may be configured not to output the trace information 131 (S66) when one of the monitoring subject programs 1 has called up another program at the execution condition determination timing of S61, for example. More specifically, the monitoring subject program 1 may call up another program even when the shared resource 2 is being used by the monitoring subject program 1. Hence, the trace information output unit 119 may be configured not to output the trace information 131 when one of the monitoring subject programs 1 calls up another program while the shared resource 2 is being used by the monitoring subject program 1.

When the trace information output unit 119 determines that the timing at which to output the trace information 131 has arrived (YES in S64), the error output unit 120 notifies the operations manager that an error has occurred, for example (S65). Further, in this case, for example, the trace information output unit 119 outputs the trace information 131 (S66) and the trace information deletion unit 116 deletes the trace information 131 (S67). The processing performed by the error output unit 120 to output the error was described using FIG. 8, and will not therefore be described in detail here.

[Specific Examples of Trace Information and Counter Information]

Next, specific examples of the trace information 131 and the counter information 132 will be described. FIG. 11 depicts a specific example of the trace information 131, and FIG. 12A and FIG. 12B depict a specific example of the counter information 132.

The trace information 131 illustrated in FIG. 11 includes following items: a "trace identification ID" identifying the trace information 131; a "job identification ID" identifying a job currently being executed; a "program identification ID" identifying a program included in the job currently being executed; and an "event" indicating an event that has occurred. Further, the trace information 131 illustrated in FIG. 11 includes following items: a "transfer source program identification ID" identifying a transfer source program when an executed program is transferred; and an "event call-up source address" indicating a storage address of a command to generate the event. Furthermore, the trace information 131 illustrated in FIG. 11 includes following items: a "pre-update counter value", which is the value of the counter information 132 prior to creation of the trace information 131; an "updated counter value", which is the value of the counter information 132 following creation of the trace information 131; and a "time" indicating the creation time of the trace information 131.

As illustrated in FIG. 11, the trace information 131 may be stored in the information storage area 130 such that the trace information 131 having the same job identification ID (in the example of FIG. 11, the trace information 131 having JOB1 as the "job identification ID" item) is stored together, for example. Further, when a plurality of jobs use an identical memory area, the trace information 131 may be stored in the information storage area 130 such that the trace information relating to the plurality of jobs is stored together.

Moreover, an event that serves as a trigger for creating the trace information 131 is stored in the "event" item, and in the example of FIG. 11, the "event" item includes "acquisition", indicating acquisition of the shared resource 2 by the program indicated by the "program identification ID" item, and "release", indicating release of the shared resource 2. Furthermore, in the example of FIG. 11, the "event" item includes "transfer", indicating call-up of a program or termination of the program call-up, and "completion", indicating that the processing of the job is complete.

More specifically, in FIG. 11, the trace information 131 having 1 as the "trace identification ID" item includes information created when a program PG1-1 included in JOB1 acquires the shared resource 2. The trace information 131 also includes information indicating 0 as the value (also referred to as a counter value hereafter) of the counter information 132 prior to acquisition of the shared resource 2 and 1 as the counter value following acquisition of the shared resource 2. Furthermore, the trace information 131 includes information indicating that the storage address of the command to acquire the shared resource 2 is block 10 of PG1-1, and that the creation time of the trace information 131 is 13:00 and 31 seconds, Sep. 8, 2014.

Further, in FIG. 11, the trace information 131 having 2 as the "trace identification ID" item includes information created when PG1-1 releases the shared resource 2. The trace information 131 also includes information indicating 1 as the counter value prior to release of the shared resource 2 and 0 as the counter value following release of the shared resource 2. Furthermore, the trace information 131 includes information indicating that the storage address of the command to release the shared resource 2 is block 30 of PG1-1, and that the creation time of the trace information 131 is 13:10 and 23 seconds, Sep. 8, 2014.

Moreover, in FIG. 11, the trace information 131 having 3 as the "trace identification ID" item includes information created when PG1-2 is called up by PG1-1. Further, in FIG. 11, the trace information 131 having 11 as the "trace identification ID" item includes information created when all of the processing of the programs (PG1-1, PG1-2, and PG1-3 in the example of FIG. 11) included in JOB1 is completed. The remaining information included in the trace information 131 of FIG. 11 is similar to that described above, and therefore further description thereof has been omitted.

Note that FIG. 11 depicts an example of a case in which the trace information 131 is likewise created when a program is called up and the processing relating to the job is completed, but the trace information 131 may be created only when the shared resource 2 is acquired and released.

Next, a specific example of the counter information 132 will be described. FIG. 12A depicts a specific example of information (also referred to as control information hereafter) in which the trace information 131 is associated with the counter information 132. The control information depicted in FIG. 12A includes following items: a "resource identification ID" identifying the shared resource 2; and a "trace information storage address" indicating a storage address of the trace information 131 relating to a job that uses the shared resource 2 indicated by the "resource identification ID" item. The control information depicted in FIG. 12A also includes a "counter information storage address" item indicating a storage address of the counter information 132 relating to the job that uses the shared resource 2 indicated by the "resource identification ID" item. Note that respective memory areas depicted in FIG. 12A correspond to parts of the shared resource 2 illustrated in FIG. 1, for example.

More specifically, in FIG. 12A, the control information relating to a memory area 1-1 includes information indicating that AAA is the storage address of the trace information 131 relating to a job that may acquire or release the memory area 1-1. For example, when the job that uses the memory area 1-1 is JOB1 depicted in FIG. 11, the trace information 131 depicted in FIG. 11 is stored at the address AAA. Further, the trace information 131 corresponding respectively to memory areas 1-2, 1-3, 1-4 is stored similarly at addresses BBB, CCC, DDD.

FIG. 12B depicts a specific example of the counter information 132 relating to the number of programs that have acquired the memory area 1-1. The counter information 132 depicted in FIG. 12B includes, for example, a "counter value" item indicating the number of programs that have acquired the memory area 1-1. More specifically, in the counter information 132 of the example depicted in FIG. 12B, 2 is stored as the number of programs that have acquired the memory area 1-1. Note that the counter information corresponding respectively to the memory areas 1-1, 1-2, 1-3, 1-4 is stored at addresses EEE, FFF, GGG, HHH.

Hence, in the examples of FIG. 11, FIG. 12A and FIG. 12B, the information included in the trace information 131 depicted in FIG. 11 and the information included in the counter information 132 depicted in FIG. 12B are associated with each other by the information included in the control information depicted in FIG. 12A. As a result, the trace information 131 depicted in FIG. 11 and the counter information 132 depicted in FIG. 12B can be managed in association with each other in relation to each "resource identification ID" item in the control information depicted in FIG. 12A.

[Specific Example of Trace Information Management Processing]

Figure 13:
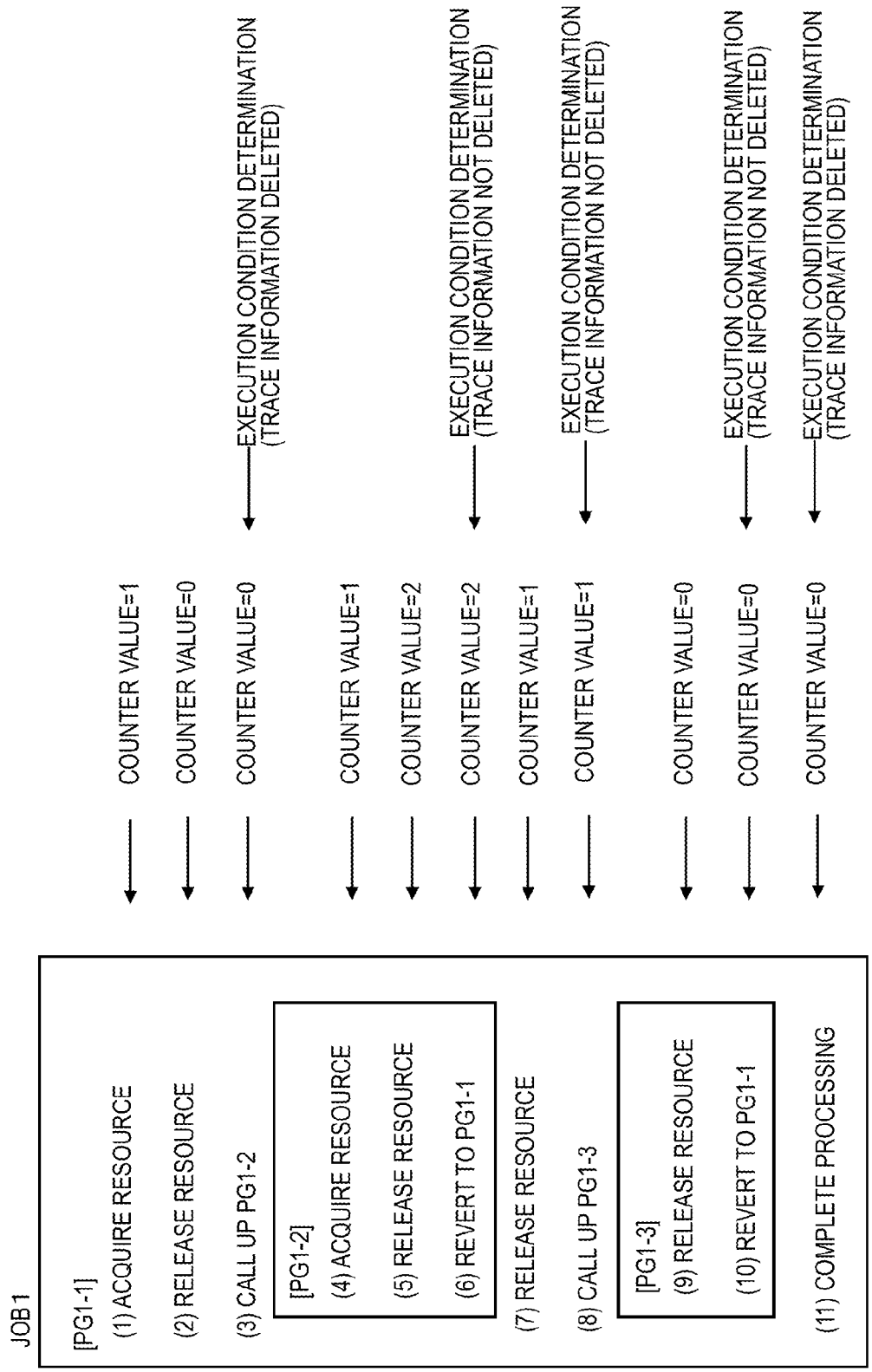
FIG. 13 and FIG. 14 are views illustrating the trace information management processing according to the first embodiment in detail.
Figure 14:
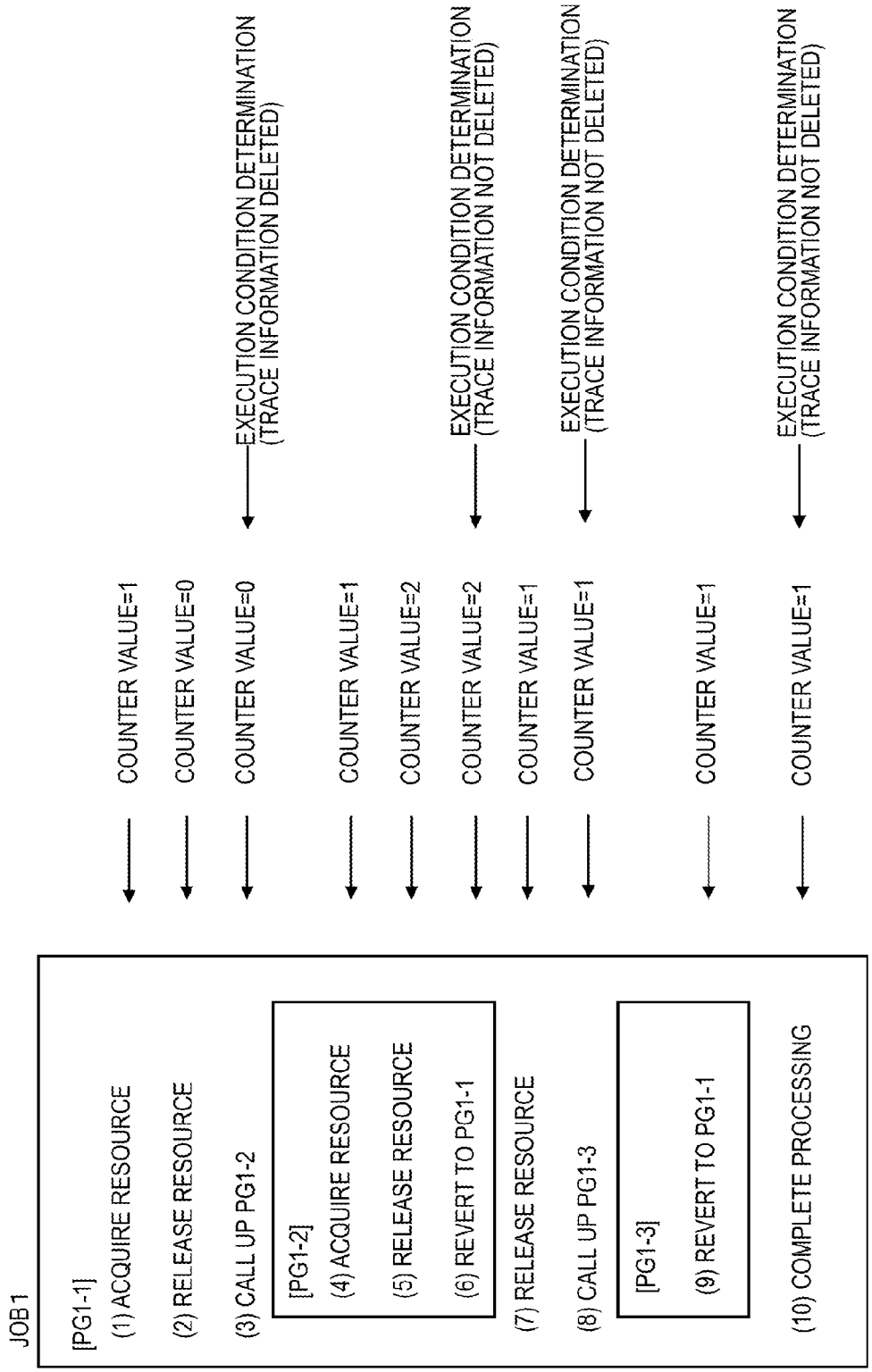

Next, a specific example of the trace information management processing will be described with reference to the trace information 131 depicted in FIG. 11 and the counter information 132 depicted in FIG. 12A and FIG. 12B. FIG. 13 and FIG. 14 are views illustrating a specific example of the trace information management processing. More specifically, FIG. 13 and FIG. 14 illustrate a flow of the trace information management processing implemented when JOB1 depicted in FIG. 11 acquires or releases the memory area 1-1. Note that in the following description, as illustrated in FIG. 13 and FIG. 14, it is assumed that the execution condition determination unit 115 determines whether or not to delete the trace information 131 when a program is called up and when the processing of the job is completed.

In the example of FIG. 13, PG1-1 is executed at the same time as JOB1 is started. At this point in time, the memory area 1-1 has not been acquired by any program, and therefore the value indicated by the counter information 132 is 0. PG1-1 acquires the memory area 1-1 when executed, and releases the memory area 1-1 thereafter ((1) and (2) in FIG. 13). In this case, the counter information storage unit 114 updates the "counter value" item of the counter information 132 depicted in FIG. 12B from 0 to 1 when the memory area 1-1 is acquired, and updates the "counter value" item from 1 to 0 when the memory area 1-1 is released. Further, the trace information creation unit 111 creates the trace information 131 having 1 and 2 as the "trace identification ID" item in FIG. 11 upon acquisition and release of the memory area 1-1, whereupon the trace information storage unit 112 stores the created trace information 131 in the information storage area 130.

Next, in the example of FIG. 13, PG1-1 calls up PG1-2 when executed ((3) in FIG. 13). In this case, the shared resource 2 is not acquired or released by any of the monitoring subject programs 1, and therefore the counter information storage unit 114 does not update the counter information 132. Further, the trace information creation unit 111 creates the trace information 131 having 3 as the "trace identification ID" item in FIG. 11. Moreover, in this case, the execution condition determination unit 115 in the example of FIG. 13 determines whether or not to delete the trace information 131 by referring to the counter value. More specifically, in the example of FIG. 13, the counter value upon call-up of PG1-2 is 0, and therefore the trace information deletion unit 116 deletes the trace information 131 having 1 to 3 as the "trace identification ID" item in FIG. 11. In other words, in this case, the execution condition determination unit 115 determines that a failure to release the shared resource 2 has not occurred during the processing executed between (1) and (3) in FIG. 13. Accordingly, the trace information deletion unit 116 deletes the trace information 131.

Next, in the example of FIG. 13, PG1-2 acquires the memory area 1-1 twice when executed, and then calls up PG1-1 (reverts to PG1-1) ((4), (5), (6) in FIG. 13). In this case, the counter information storage unit 114 updates the "counter value" item of the counter information 132 depicted in FIG. 12B from 0 to 1 and then from 1 to 2. Further, the trace information creation unit 111 creates the trace information 131 having 4, 5, and 6 as the "trace identification ID" item in FIG. 11. Next, in the example of FIG. 13, PG1-1 releases the memory area 1-1 when executed ((7) in FIG. 13). In this case, the counter information storage unit 114 updates the "counter value" item of the counter information 132 depicted in FIG. 12B from 2 to 1. Further, the trace information creation unit 111 creates the trace information 131 having 7 as the "trace identification ID" item in FIG. 11 when the memory area 1-1 is released.

Next, in the example of FIG. 13, PG1-1 calls up PG1-3 ((8) in FIG. 13). In this case, similarly to (3) in FIG. 13, the counter information 132 is not updated. Further, the trace information creation unit 111 creates the trace information 131 having 8 as the "trace identification ID" item in FIG. 11 when the program is called up. Furthermore, the execution condition determination unit 115 determines whether or not to delete the trace information 131 by referring to the counter value. More specifically, in the example of FIG. 13, the counter value upon call-up of PG1-3 is 1, and therefore the trace information deletion unit 116 does not delete the currently stored trace information 131 (the trace information 131 having 4 to 8 as the "trace identification ID" item in FIG. 11).

Next, in the example of FIG. 13, PG1-3 releases the memory area 1-1 when executed, and then calls up PG1-1 (reverts to PG1-1) ((9), (10) in FIG. 13). In this case, the counter information storage unit 114 updates the "counter value" item of the counter information 132 depicted in FIG. 12A and FIG. 12B from 1 to 0. Further, the trace information creation unit 111 creates the trace information 131 having 9 and 10 as the "trace identification ID" item in FIG. 11.

Next, in the example of FIG. 13, the processing of PG1-1, 1-2, and 1-3 is completed, whereby JOB1 is completed ((11) in FIG. 13). In this case, the shared resource 2 is not acquired or released by any of the monitoring subject programs 1, and therefore the counter information storage unit 114 does not update the counter information 132. Further, the trace information creation unit 111 creates the trace information 131 having 11 as the "trace identification ID" item in FIG. 11. The execution condition determination unit 115 then determines whether or not to delete the trace information 131 by referring to the counter value. More specifically, in the example of FIG. 13, the counter value upon completion of the job is 0, and therefore the trace information deletion unit 116 deletes the trace information 131 having 4 to 11 as the "trace identification ID" item in FIG. 11. In other words, in the example of FIG. 13, the counter value upon completion of the job ((11) in FIG. 13) is 0, and it is therefore determined that a failure to release the shared resource 2 has not occurred during execution of JOB1 ((1) to (11) in FIG. 13).

Note that in a case where the execution condition determination unit 115 determines whether or not to delete the trace information 131, the trace information creation unit 111 may create the trace information 131 after the execution condition determination unit 115 determines not to delete the trace information 131. In so doing, creation of trace information 131 that will be deleted immediately thereafter can be avoided. Alternatively, the trace information creation unit 111 may refrain from creating the trace information 131 in a case where the execution condition determination unit 115 determines whether or not to delete the trace information 131.

FIG. 14 illustrates an example of a case in which a failure to release the shared resource 2 occurs. More specifically, FIG. 14 illustrates an example of a case in which the shared resource 2 is not released as intended during (9) in FIG. 13. In the example of FIG. 14, a failure to release the shared resource 2 occurs once, and therefore the counter value is 1 upon completion of the job ((10) in FIG. 14). In this case, therefore, the error output unit 120 outputs an error indicating that a resource release failure has occurred, for example (S65 in FIG. 10). Accordingly, the trace information output unit 119 performs processing to store the trace information stored in the information storage area 130 in another storage medium or the like, for example (S66 in FIG. 10).

More specifically, in the example of FIG. 14, the trace information 131 stored in the information storage area 130 upon completion of the job ((10) in FIG. 14) is the trace information 131 having 4 to 11 as the "trace identification ID" item in FIG. 11. Accordingly, the trace information output unit 119 outputs the trace information 131 having 4 to 11 as the "trace identification ID" item in FIG. 11, for example. Here, upon completion of the job in the example of FIG. 14, the trace information 131 having 1 to 3 as the "trace identification ID" item in FIG. 11 has already been deleted. Therefore, upon completion of the job (i.e. when the abnormality occurs) in FIG. 14, the operations manager does not have to check the information (the trace information 131 having 1 to 3 as the "trace identification ID" item) that has been determined not to include information relating to the abnormality. Hence, by executing the trace information management processing according to the first embodiment, the time taken by the operations manager to specify the program (PG1-3 in the example of FIG. 14) that has caused the abnormality can be shortened.

Second Embodiment

Figure 15:
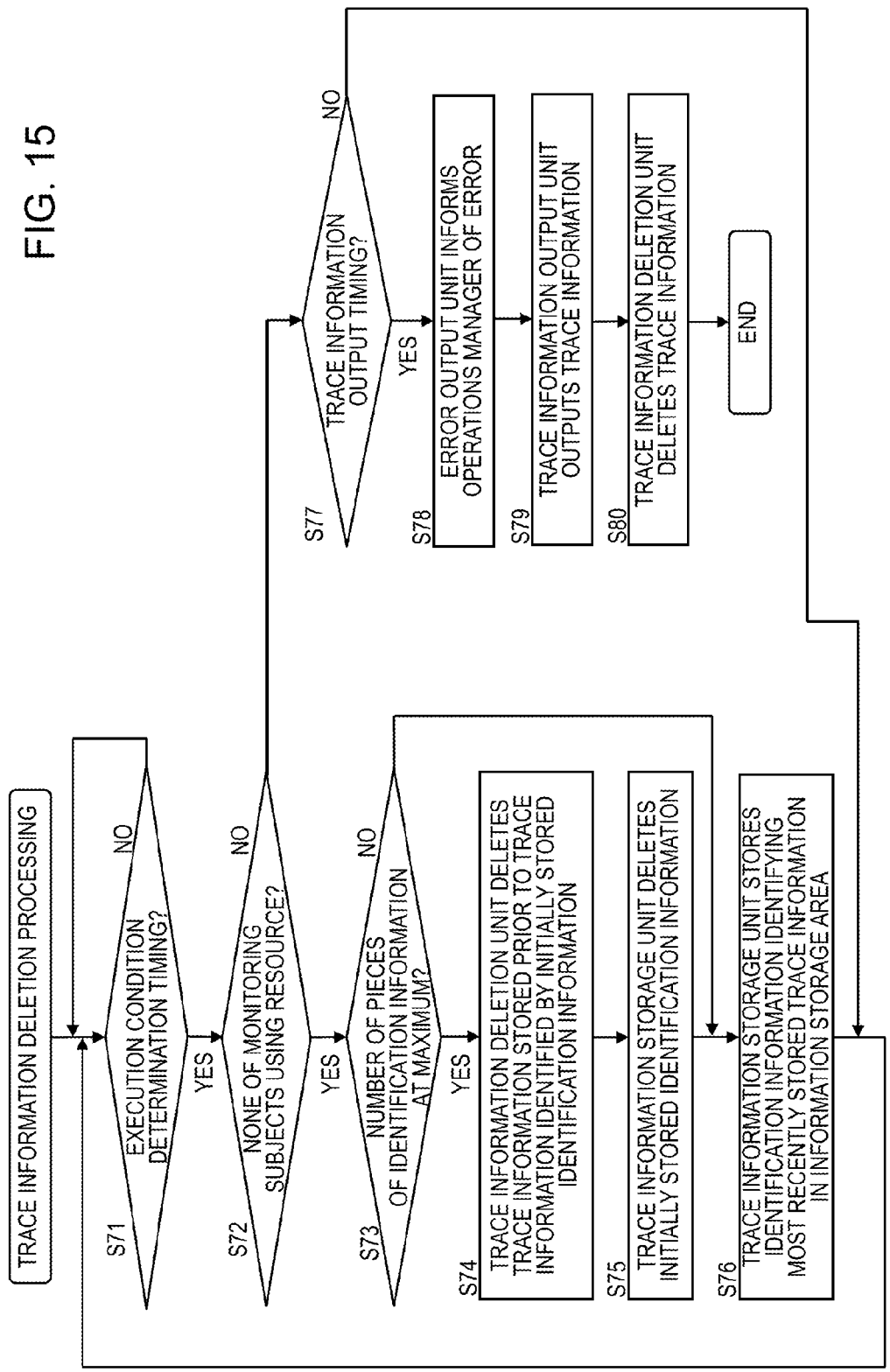
FIG. 15 is a flowchart illustrating trace information management processing according to the second embodiment.
Figure 16:
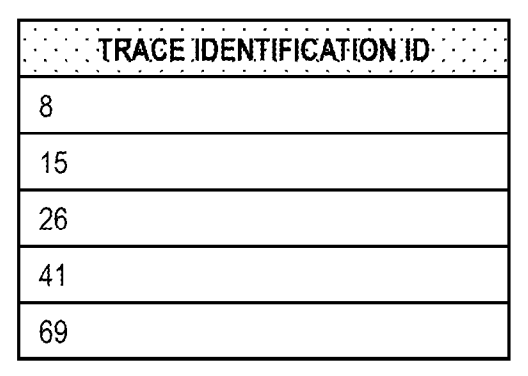

Next, a second embodiment will be described. FIG. 15 is a flowchart illustrating trace information management processing according to the second embodiment. Further, FIG. 16 is a view illustrating the trace information management processing according to the second embodiment. The trace information management processing illustrated in FIG. 15 will now be described while referring to FIG. 16.

The counter information 132 described in the first embodiment may be updated against the wishes of the operations manager when a resource is released from a program erroneously. In this case, the trace information deletion unit 116 may delete the trace information 131 even though the shared resource 2 is actually still in use by the monitoring subject programs 1. The resource is released unintentionally in this case, and therefore the counter value eventually becomes negative. With regard to this point, in the first embodiment, as described in S54 of FIG. 9, the operations manager can be notified that an error has occurred by detecting updates of the counter information 132. When the resource is released at an unintended timing, however, the trace information deletion unit 116 may delete the trace information 131 before the operations manager is notified of the error.

Hence, in the trace information management processing according to the second embodiment, the trace information 131 is not deleted until a predetermined condition is satisfied, even when the execution condition determination unit 115 determines that none of the monitoring subject programs 1 are using the shared resource 2. As a result, the likelihood that the trace information 131 will be deleted at an inappropriate timing in a case where the counter information 132 is updated at an unintended timing can be reduced. The trace information management processing according to the second embodiment is described below.

[Trace Information Deletion Processing of Second Embodiment]

First, trace information deletion processing according to the second embodiment will be described. Note that trace information storage processing is identical to that of the first embodiment, and will not therefore be described here.

In FIG. 15, first, similarly to the first embodiment, the execution condition determination unit 115 remains on standby until the timing at which to implement the execution condition determination arrives, for example (S71). When the timing at which to implement the execution condition determination arrives (YES in S71), the execution condition determination unit 115 determines whether or not all of the monitoring subject programs 1 have stopped using the shared resource 2, for example (S72). When the execution condition determination unit 115 determines as a result that none of the monitoring subject programs 1 are using the shared resource 2 (YES in S72), the trace information deletion unit 116 checks whether or not the number of pieces of identification information 134 stored in the information storage area 130 is at a maximum (S73). The identification information 134 is information identifying the trace information 131 stored at the point where the execution condition determination unit 115 determines that all of the monitoring subject programs 1 have released the shared resource 2. Further, a maximum of five pieces of the identification information 134, for example, can be stored in the information storage area 130. Note that the identification information 134 will be described in detail below.

When the number of pieces of identification information 134 is at the maximum (YES in S73), the trace information deletion unit 116 deletes the trace information 131 that was stored prior to the trace information 131 identified by the identification information 134 stored initially in the information storage area 130, for example (S74). Further, the trace information storage unit 112 deletes the identification information 134 stored initially in the information storage area 130, for example (S75). When the number of pieces of identification information 134 is not at the maximum (NO in S73), on the other hand, the trace information deletion unit 116 does not delete the identification information 134 and the trace information 131, for example.

In other words, when the number of pieces of identification information stored in the information storage area 130 is not at the maximum, the trace information deletion unit 116 does not delete the trace information 131, even after the execution condition determination unit 115 has determined that none of the monitoring subject programs 1 are using the shared resource 2. Further, when the number of pieces of identification information 134 stored in the information storage area 130 is at the maximum, the trace information deletion unit 116 deletes only the trace information 131 that was stored prior to the trace information 131 identified by the initially stored identification information 134. As a result, a time window in which the trace information deletion unit 116 does not delete the trace information 131 can be provided in a case where the execution condition determination unit 115 determines that none of the monitoring subject programs 1 are using the shared resource 2. Furthermore, in a case where the counter information 132 is updated at a timing not intended by the operations manager due to an external factor or the like, the likelihood that the trace information 131 will be deleted by the trace information deletion unit 116 on the basis of the erroneous counter information 132 can be reduced.

After the trace information storage unit 112 deletes the initially stored identification information 134 (S75), the trace information storage unit 112 stores the trace information identification ID included in the most recently stored trace information 131 as the identification information 134, for example (S76). Likewise in a case where the number of pieces of identification information 134 stored in the information storage area 130 is not at the maximum (NO in S73), the trace information storage unit 112 stores the trace information identification ID included in the most recently stored trace information 131 as the identification information 134, for example (S76).

Further, when the execution condition determination unit 115 determines that one of the monitoring subject programs 1 is still using the shared resource 2 (NO in S72), the trace information output unit 119 determines whether or not to output the trace information 131 stored in the information storage area 130, for example (S77). When the trace information output unit 119 determines that the timing at which to output the trace information 131 has arrived (YES in S77), the error output unit 120 informs the operations manager that an error has occurred, for example (S78). Moreover, in this case, for example, the trace information output unit 119 outputs the trace information 131 (S79) and the trace information deletion unit 116 deletes the trace information 131 (S80). A case in which the error output unit 120 outputs an error was described using FIG. 8, and therefore detailed description of this case will not be described here.

[Specific Example of Identification Information]

FIG. 16 depicts a specific example of the identification information 134. The identification information 134 depicted in FIG. 16 includes a "trace identification ID" item. Note that in the following description, it is assumed that a maximum of five trace identification IDs can be stored in the identification information 134 depicted in FIG. 16.

More specifically, five pieces of information, namely 8, 15, 26, 41, and 69, are stored in the identification information 134 depicted in FIG. 16 as the "trace identification ID" item. When the trace information 131 having 8, 15, 26, 41, and 69 as the "trace identification ID" item is stored in the identification information 134 depicted in FIG. 16, this indicates that all of the monitoring subject programs 1 have released the shared resource 2. Further, since five trace identification IDs are stored in the identification information 134 depicted in FIG. 16, the identification information 134 includes the maximum storable number of trace identification IDs. Therefore, when the execution condition determination unit 115 determines that the entire shared resource 2 has been released in the example of FIG. 16, the trace information storage unit 112 deletes the trace information 131 that was stored before the trace information 131 having 8 as the "trace identification ID" item (S74). Further, the trace information storage unit 112 stores the trace identification IDs indicating the trace information 131 stored at the point where the execution condition determination unit 115 determines that the entire shared resource 2 has been released in the information storage area 130 as the identification information 134 (S75, S76).

In other words, in the trace information management processing according to the second embodiment, when the entire shared resource 2 is determined to be released, the trace information storage unit 112 stores the identification information 134 identifying the trace information 131 stored at the time of the determination. Further, when the number of pieces of stored identification information 134 is at the maximum value, the trace information deletion unit 116 deletes the trace information 131 that was stored before the trace information 131 indicated by the trace identification IDs included in the initially stored identification information 134. Hence, when it is determined that the entire shared resource 2 has been released, the trace information deletion unit 116 can delete only the part of the trace information 131, for which the time window has elapsed, among the trace information 131 stored in the information storage area 130. As a result, the likelihood that the trace information 131 will be deleted on the basis of erroneous counter information 132 can be reduced.

Third Embodiment

Figure 17:
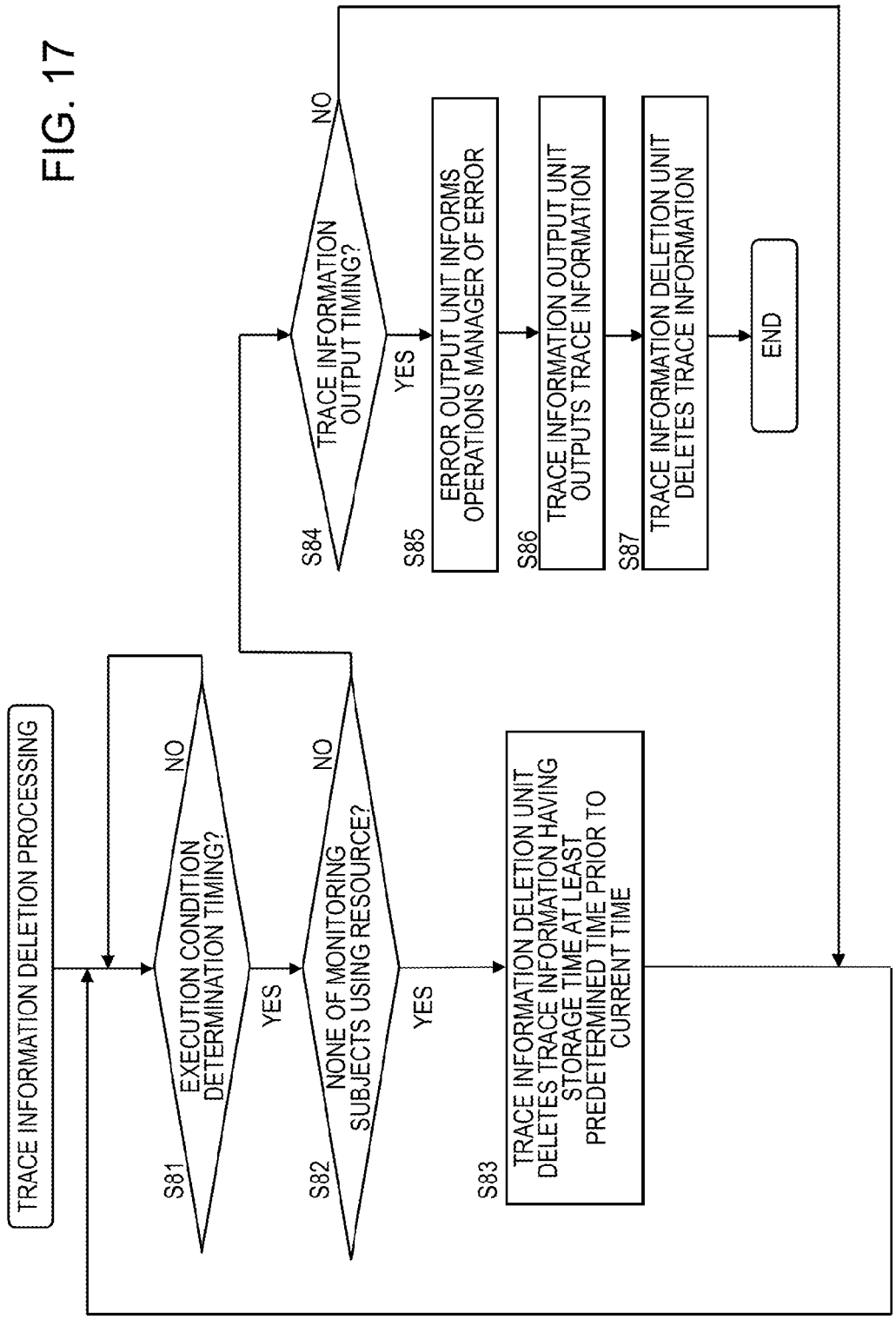
FIG. 17 is a flowchart illustrating trace information management processing according to the third embodiment.

Next, a third embodiment will be described. FIG. 17 is a flowchart illustrating trace information management processing according to the third embodiment. Further, FIG. 18 is a view illustrating the trace information management processing according to the third embodiment. The trace information management processing illustrated in FIG. 17 will now be described while referring to FIG. 18.

In the trace information management processing according to the third embodiment, similarly to the second embodiment, a time window during which the trace information 131 is not deleted is provided when the execution condition determination unit 115 determines that none of the monitoring subject programs 1 are using the shared resource 2. More specifically, the third embodiment differs from the second embodiment in that when the trace information 131 is stored, the acquisition time information 133, i.e. the time at which the trace information 131 was obtained, is also stored. The trace information deletion unit 116 then deletes the trace information 131 by referring to the acquisition time information 133. Hence, similarly to the second embodiment, when the counter information 132 is updated following erroneous release of a resource, the likelihood that the trace information 131 will be deleted on the basis of information that does not reflect the actual number of monitoring subject programs 1 using the shared resource 2 (the number of processes executed by the monitoring subject programs 1) can be reduced. The trace information management processing according to the third embodiment is described below.

[Trace Information Deletion Processing]

First, trace information deletion processing according to the third embodiment will be described. Note that trace information storage processing is identical to that of the first embodiment, and will not therefore be described here.

As illustrated in FIG. 17, first, similarly to the first embodiment, the execution condition determination unit 115 remains on standby (NO in S81) until the timing at which to implement the execution condition determination arrives, for example. When the timing at which to implement the execution condition determination arrives (YES in S81), the execution condition determination unit 115 determines whether or not all of the monitoring subject programs 1 have stopped using the shared resource 2 (S82). When the execution condition determination unit 115 determines as a result that none of the monitoring subject programs 1 are currently using the shared resource 2 (YES in S82), the trace information deletion unit 116 refers to the acquisition time information 133 stored in the information storage area 130, for example. The trace information deletion unit 116 then deletes only the trace information 131 stored at least a predetermined time prior to a current time, for example (S83). The predetermined time is a minimum storage time of the trace information 131, and is set at five minutes or the like, for example. A specific example of a case in which the trace information 131 stored at least the predetermined time prior to the current time is detected will be described below.

Further, when the execution condition determination unit 115 determines that all of the monitoring subject programs 1 are using the shared resource 2 (NO in S82), the trace information output unit 119 determines whether or not to output the trace information 131, similarly to the first embodiment, for example (S84). When the trace information output unit 119 determines that the timing at which to output the trace information 131 has arrived (YES in S84), the error output unit 120 notifies the operations manager that an error has occurred, for example (S85). Furthermore, in this case, for example, the trace information output unit 119 outputs the trace information 131 (S86) and the trace information deletion unit 116 deletes the trace information 131 (S87). A case in which the error output unit 120 outputs an error was described using FIG. 8, and will not therefore be described in detail here.

[Specific Example (1) of Acquisition Time Information]

FIG. 18 to FIG. 19B depict specific examples of the acquisition time information 133. The acquisition time information 133 depicted in FIG. 18 to FIG. 19B includes following items: a "trace identification ID" identifying the trace information 131; and a "time" indicating a storage time of the trace information 131. More specifically, the acquisition time information 133 depicted in FIG. 18 indicates that the storage time of the trace information 131 having 1 as the "trace identification ID" item is 13:10 and 12 seconds, for example. Description of the remaining acquisition time information 133 depicted in FIG. 18 has been omitted. A case in which the predetermined time of S83 is set at five minutes will be described below.

In the example of FIG. 18, when the current time is 13:18 and 00 seconds, for example, the information having 1 to 6 as the "trace identification ID" item corresponds to information indicating a time at least five minutes prior to the current time in the "time" item. In the example of FIG. 18, therefore, the trace information deletion unit 116 deletes the trace information 131 having 1 to 6 as the "trace identification ID" item from the trace information 131 stored in the information storage area 130 (S83).

According to the third embodiment, in other words, when the trace information storage unit 112 stores the trace information 131 in the information storage area 130, the trace information storage unit 112 also stores the acquisition time information 133 indicating the storage time of the trace information 131. As a result, when the trace information deletion unit 116 deletes the trace information, the trace information deletion unit 116 can delete only the trace information 131 for which the predetermined time has elapsed by referring to the acquisition time information 133.

[Specific Example (2) of Acquisition Time Information]

Next, another specific example of the acquisition time information 133 will be described. FIG. 19A and FIG. 19B depict a specific example of a case in which only a part of the acquisition time information 133 is stored in the information storage area 130.

The acquisition time information storage unit 117 may store the acquisition time information 133 relating to a part of (one piece of, for example) the trace information 131 for which the minimum storage time of the trace information 131 (i.e. the predetermined time of S85) has elapsed, for example. For example, the acquisition time information storage unit 117 stores, at fixed intervals, the acquisition time information 133 relating to the trace identification ID that indicates the newest trace information 131, among the trace information 131 for which the minimum storage time of the trace information 131 has elapsed. The trace information deletion unit 116 then deletes the trace information 131 by referring to the acquisition time information 133. As a result, the trace information deletion unit 116 can delete the trace information 131 without storing the acquisition time information in relation to all of the trace information 131. This specific example will be described below with reference to the example depicted in FIG. 19A and FIG. 19B.

FIG. 19A illustrates an example of the acquisition time information 133 at 13:25 and 00 seconds. The acquisition time information 133 depicted in FIG. 19A includes information relating to trace information created at 13:19 and 53 seconds, which is the trace information 131 having 12 as the trace identification ID. In other words, the acquisition time information storage unit 117 stores information relating to the trace information 131 (in the example of FIG. 19A, information relating to a single piece of trace information 131) for which the minimum storage time of the trace information 131 has elapsed, as the acquisition time information 133. As a result, the trace information deletion unit 116 can delete the trace information 131 created prior to the trace information 131 indicated by the trace identification ID included in the acquisition time information 133 by referring to the acquisition time information 133 depicted in FIG. 19A. Note that the acquisition time information storage unit 117 preferably stores the information relating to the newest trace information 131, among the trace information 131 for which the minimum storage time of the trace information 131 has elapsed, as the acquisition time information 133, for example.

FIG. 19B illustrates an example of the acquisition time information 133 at 13:27 and 00 seconds. The acquisition time information 133 depicted in FIG. 19B includes information relating to trace information created at 13:21 and 59 seconds, which is the trace information 131 having 25 as the trace identification ID. The acquisition time information 133 depicted in FIG. 19B is obtained when the acquisition time information 133 depicted in FIG. 19A is updated. The acquisition time information 133 may be updated by the acquisition time information storage unit 117 at fixed time intervals (two-minute intervals or the like), for example. In other words, by having the acquisition time information storage unit 117 update the acquisition time information 133 stored in the information storage area 130, the acquisition time information 133 indicating the deletable trace information 131 can be updated. As a result, the trace information deletion unit 116 can obtain information relating to the deletable trace information 131 by referring to the acquisition time information 133. The trace information deletion unit 116 can then delete the trace information 131 on the basis of the information relating to the deletable trace information 131.

More specifically, for example, when a program is called up at 13:26 and 15 seconds, the trace information deletion unit 116 refers to the acquisition time information 133 in the condition depicted in FIG. 19A, and deletes the trace information 131 having 12 as the trace identification ID and the trace information 131 that is older than the trace information

131 having 12 as the trace identification ID. Further, when the job is completed at 13:27 and 10 seconds, for example, the trace information deletion unit 116 refers to the acquisition time information 133 in the condition depicted in FIG. 19B, and deletes the trace information 131 having 25 as the trace identification ID and the trace information 131 that is older than the trace information 131 having 25 as the trace identification ID. In so doing, the trace information deletion unit 116 can specify the trace information 131 to be deleted simply by referring to the acquisition time information 133 stored in relation to only a predetermined number of pieces (one in the example of FIG. 19A and FIG. 19B) of the trace information 131. As a result, the trace information deletion unit 116 can specify the trace information 131 to be deleted in a stable processing time without being affected by variation in a frequency with which the trace information 131 is created at each time.

Note that when the trace information 131 includes information relating to the creation time, as depicted in FIG. 11, the trace information deletion unit 116 may specify the trace information 131 to be deleted by referring to the trace information 131.

[Trace Information Management Completion Processing]

Next, processing (also referred to hereafter as trace information management completion processing) performed by the operations manager to complete the trace information management processing in the first to third embodiments will be described. FIG. 20 is a flowchart illustrating the trace information management completion processing. The trace information management completion processing is described below.

As illustrated in FIG. 20, first, the execution condition determination unit 115 remains on standby (NO in S91) until an instruction from the operations manager to start the trace information management completion processing is input therein, for example. When the instruction from the operations manager to start the trace information management completion processing is input (YES in S91), the execution condition determination unit 115 determines whether or not all of the monitoring subject programs 1 have finished using the shared resource 2, for example (S92). When it is determined as a result that all of the monitoring subject programs 1 have not finished using the shared resource 2 (NO in S92), the trace information output unit 119 outputs the trace information 131 stored in the information storage area 130, for example (S93). When all of the monitoring subject programs 1 have finished using the shared resource 2 (YES in S92) or after the trace information 131 is output (S93), the trace information deletion unit 116 deletes the trace information 131 stored in the information storage area 130, for example (S94).

In other words, when the operations manager completes the trace information management processing, the memory area secured in order to execute the trace information management processing needs to be released, for example. Therefore, when all of the monitoring subject programs 1 have finished using the shared resource 2 (YES in S92), the trace information deletion unit 116 deletes the trace information 131 stored in the information storage area 130 and then releases the memory area secured for the trace information management processing. Further, when all of the monitoring subject programs 1 have not finished using the shared resource 2 (NO in S92), the trace information output unit 119 outputs the trace information 131 stored in the information storage area 130 and then releases the memory area secured for the trace information management processing. As a result, the memory area secured for the trace information management processing can be released regardless of the content of the counter information 132 at the point where the trace information management completion processing is executed.

[When Monitoring Subject Programs are Divided Among Plural Physical Machines]

Figure 21:
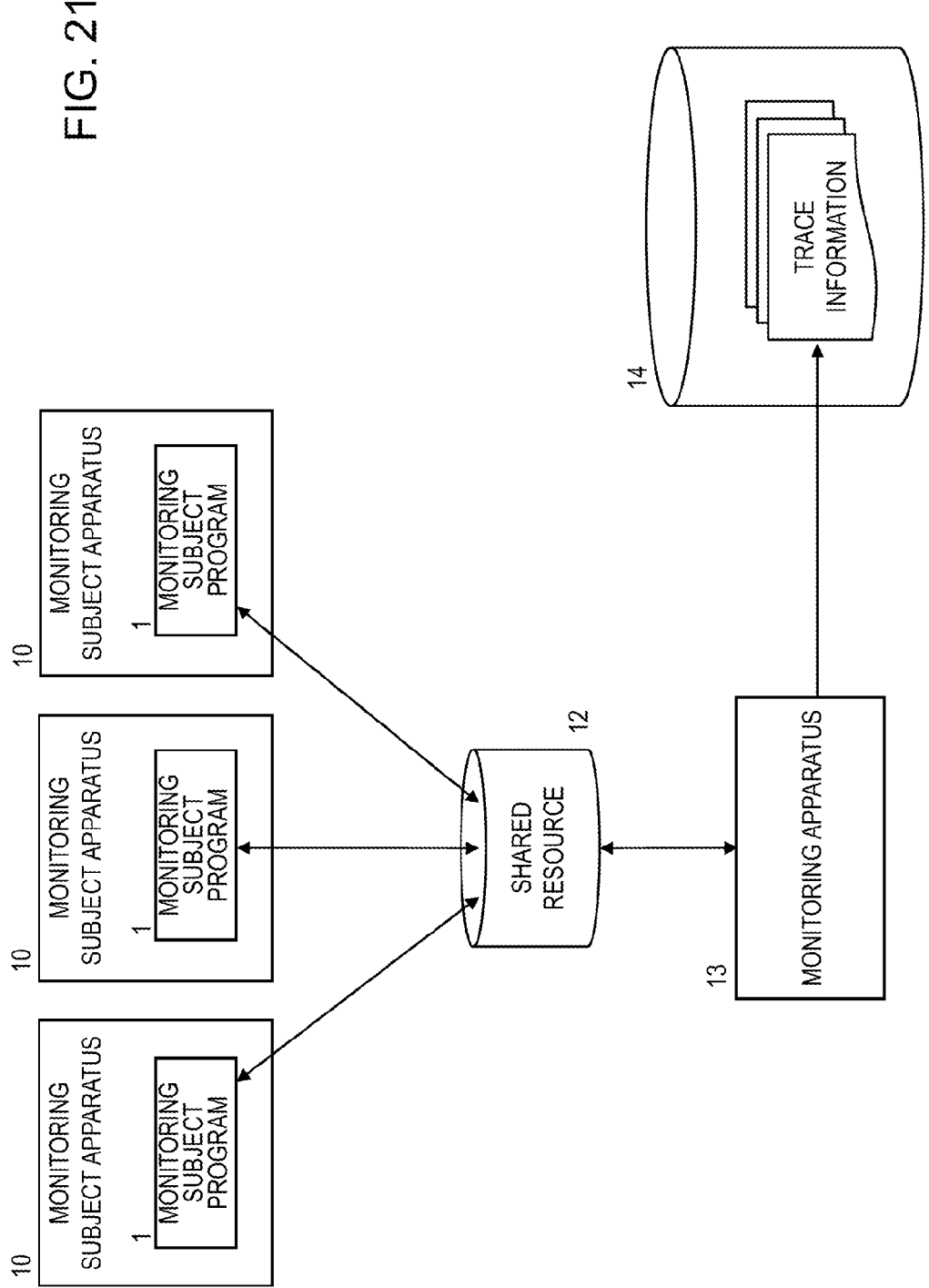
FIG. 21 is a view illustrating a case in which the physical machine on which the monitoring subject programs operate is divided into a plurality of physical machines.

Next, a case in which the monitoring subject programs 1 are divided among a plurality of physical machines will be described. FIG. 21 is a view illustrating a case in which the physical machine on which the monitoring subject programs operate is divided into a plurality of physical machines.

The plurality of monitoring subject programs 1 depicted in FIG. 1 are provided in the monitoring subject apparatus 10, which is constituted by a single physical machine. The shared resource 2 and the monitoring program 3 depicted in FIG. 1 are likewise provided in the monitoring subject apparatus 10. Instead, however, the monitoring subject programs 1 may operate on a plurality of monitoring subject apparatuses 10 (physical machines).

More specifically, in an example depicted in FIG. 21, the monitoring subject programs 1 operate on a plurality of monitoring subject apparatuses 10. Further, a shared resource 12, a monitoring apparatus 13, and a storage medium 14 depicted in FIG. 21 are provided on the exterior of the monitoring subject apparatuses 10. The monitoring subject programs 1 in the respective monitoring subject apparatuses 10 depicted in FIG. 21 use the shared resource 12. For example, the monitoring subject programs 1 perform processing in cooperation with another monitoring subject program 1 provided in another monitoring subject apparatus 10. The monitoring apparatus 13 of the example depicted in FIG. 21 detects the number of monitoring subject programs 1 using the shared resource 12, for example, and deletes trace information stored in the storage medium 14 when the number of monitoring subject programs 1 using the shared resource 12 reaches 0.

In other words, the trace information management processing described in the first to third embodiments is not limited to a case in which the monitoring subject programs 1 and so on are provided in a concentrated fashion in a single physical machine, as depicted in FIG. 1, and may also be applied to a case in which the monitoring subject programs 1 and so on are provided in respectively different physical machines, as depicted in FIG. 21.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a storage configured to accumulate trace information relating to execution conditions of monitoring subjects, and store a determination value, the determination value being a number of the monitoring subjects using a specific resource which is used by the monitoring subjects; and
   a processor configured to update the determination value to a value obtained by adding a predetermined value to the determination value when one of the monitoring subjects starts to use the specific resource, update the determination value to a value obtained by subtracting the predetermined value from the determination value when one of the monitoring subjects stops using the specific resource, and delete the trace information accumulated in the storage when the determination value indicates that none of the monitoring subjects are using the specific resource.

2. The information processing apparatus according to claim 1, wherein the monitoring subjects are programs, which operate on a computer, included a job in which the programs are operated in sequence, the specific resource is a memory used by the programs.

3. The information processing apparatus according to claim 2, wherein, when the job is completed or one of the programs calls up another program, the processor determines, on the basis of the determination value, whether or not none of the programs using the memory.

4. The information processing apparatus according to claim 1, wherein, when the determination value falls below 0, the processor does not delete the trace information.

5. The information processing apparatus according to claim 1, wherein, when the determination value updates after being updated in response to a first start or an first end of use of the specific resource and before being updated in response to a second start, which is performed next to the first start or the first end, or an second end, which is performed next to the first start or the first end, of use of the specific resource, the processor does not delete the trace information.

6. The information processing apparatus according to claim 1, wherein the storage stores the trace information in association with an acquisition time of the trace information, and the processor deletes the trace information of which the acquisition time is up to a predetermined time prior to a time when the determination value is determined that the determination value indicates that none of the monitoring subjects are using the specific resource.

7. The information processing apparatus according to claim 1, wherein the storage stores identification information identifying the trace information stored when none of the monitoring subjects are using the specific resource, and the processor, when a number of stored pieces of the identification information is identical to a predetermined value, deletes the trace information stored prior to the trace information identified by the identification information stored initially in the storage, and deletes the initially stored identification information from the stored identification information.

8. The information processing apparatus according to claim 1, wherein, when the determination value indicates that none of the monitoring subjects are using the specific resource while the monitoring subjects are executing, the processor deletes the trace information accumulated in the storage.

9. An information processing method comprising:

accumulating, by a processor, in a storage, trace information relating to execution conditions of monitoring subjects, and storing, by a processor, a determination value, the determination value being a number of the monitoring subjects using a specific resource which is used by the monitoring subjects; and updating, by a processor, the determination value to a value obtained by adding a predetermined value to the determination value when one of the monitoring subjects starts to use the specific resource, updating, by a processor, the determination value to a value obtained by subtracting the predetermined value from the determination value when one of the monitoring subjects stops using the specific resource, and deleting, by a processor, the trace information accumulated in the storage when the determination value indicates that none of the monitoring subjects are using the specific resource.

10. A non-transitory computer-readable storage medium storing therein an information processing program for causing a computer to execute a process comprising:

accumulating, in a storage, trace information relating to execution conditions of monitoring subjects, and storing a determination value, the determination value being a number of the monitoring subjects using a specific resource which is used by the monitoring subjects; and updating the determination value to a value obtained by adding a predetermined value to the determination value when one of the monitoring subjects starts to use the specific resource, updating the determination value to a value obtained by subtracting the predetermined value from the determination value when one of the monitoring subjects stops using the specific resource, and deleting the trace information accumulated in the storage when the determination value indicates that none of the monitoring subjects are using the specific resource.

* * * * *